US012637180B2

(12) United States Patent (10) Patent No.: US 12,637,180 B2

Jennings et al. (45) Date of Patent: May 26, 2026

(54) SEAT ADJUSTMENT SYSTEM

(71) Applicant: Sea Otter Innovations LLC, Fort Mill, SC (US)

(72) Inventors: Zachary Jennings, Fort Mill, SC (US); Richard O. Gregory, II, Rock Hill, SC (US)

(73) Assignee: Sea Otter Innovations LLC, Mount Pleasant, SC (US)

( * ) Notice: Subject to any disclaimer, the term of this patent is extended or adjusted under 35 U.S.C. 154(b) by 492 days.

(21) Appl. No.: 18/136,784

(22) Filed: Apr. 19, 2023

(65) Prior Publication Data

US 2023/0339578 A1 Oct. 26, 2023

Related U.S. Application Data

(60) Provisional application No. 63/332,854, filed on Apr. 20, 2022.

(51) Int. Cl.
  *B63B 29/04* (2006.01)
  *B60N 2/07* (2006.01)
(52) U.S. Cl.
  CPC ............ *B63B 29/04* (2013.01); *B60N 2/0732* (2013.01); *B63B 2029/043* (2013.01)
(58) Field of Classification Search
  CPC .. B63B 29/04; B63B 2029/043; B60N 2/0732
  See application file for complete search history.

(56) References Cited

U.S. PATENT DOCUMENTS

| | | | | | |
|---|---|---|---|---|---|
| 4,425,863 | A | * | 1/1984 | Cutler | B63B 29/04 297/423.38 |
| 5,890,768 | A | * | 4/1999 | Beurteaux | B60N 2/01558 297/216.16 |
| 6,267,071 | B1 | * | 7/2001 | Ellis | B63B 29/04 114/363 |
| 6,460,818 | B1 | * | 10/2002 | Garelick | B63B 29/06 248/420 |
| 8,556,221 | B2 | * | 10/2013 | Kohen | B63B 29/00 296/65.01 |
| 2011/0168077 | A1 | * | 7/2011 | Bostrom | A47C 9/022 297/344.13 |

(Continued)

FOREIGN PATENT DOCUMENTS

| | | |
|---|---|---|
| CN | 207433760 U | 6/2018 |
| KR | 20110090495 | 8/2011 |
| WO | 2010137970 | 12/2010 |

OTHER PUBLICATIONS

Great Lakes Skipper; Article entitled: "Rinker Boat Seat Slide Track 220527—Tandem Fore/AFT (Set of 2)", located at <https://www.greatlakesskipper.com/rinker-boat-seat-slide-track-220527-tandem-fore-aft-set-of-2>, Webpage first accessed Jan. 13, 2021, 4 pgs.

(Continued)

*Primary Examiner* — S. Joseph Morano
*Assistant Examiner* — Jovon E Hayes
(74) *Attorney, Agent, or Firm* — Smith, Gambrell & Russell, LLP

(57) ABSTRACT

A system for a boat can include a pair of seat rails configured to simultaneously couple the seat to a floor of the boat in any one of multiple positions in a longitudinal direction of the seat rails, the seat rails being parallel to each other when the seat is coupled to the floor.

20 Claims, 21 Drawing Sheets

(56) References Cited

U.S. PATENT DOCUMENTS

| | | | |
|---|---|---|---|
| 2016/0311343 A1* | 10/2016 | Mildner .............. | B60N 2/1615 |
| 2018/0147956 A1* | 5/2018 | Furukawa ............. | B60N 2/071 |
| 2020/0346717 A1* | 11/2020 | Fuller, IV ............. | B63B 29/06 |
| 2023/0339578 A1* | 10/2023 | Jennings ............. | B60N 2/0705 |

OTHER PUBLICATIONS

IGUS; Catalog for DryLin W—Profile guides—Product range, accessed on Oct. 6, 2021, 1 pg.
Taco Marine; Article entitled: "Low Profile Adjustable Seat Slide 13"×36"", located at <https://tacomarine.com/taco-seating-seat-slides-m20-3613>, accessed on Feb. 9, 2022, 6 pgs.

\* cited by examiner

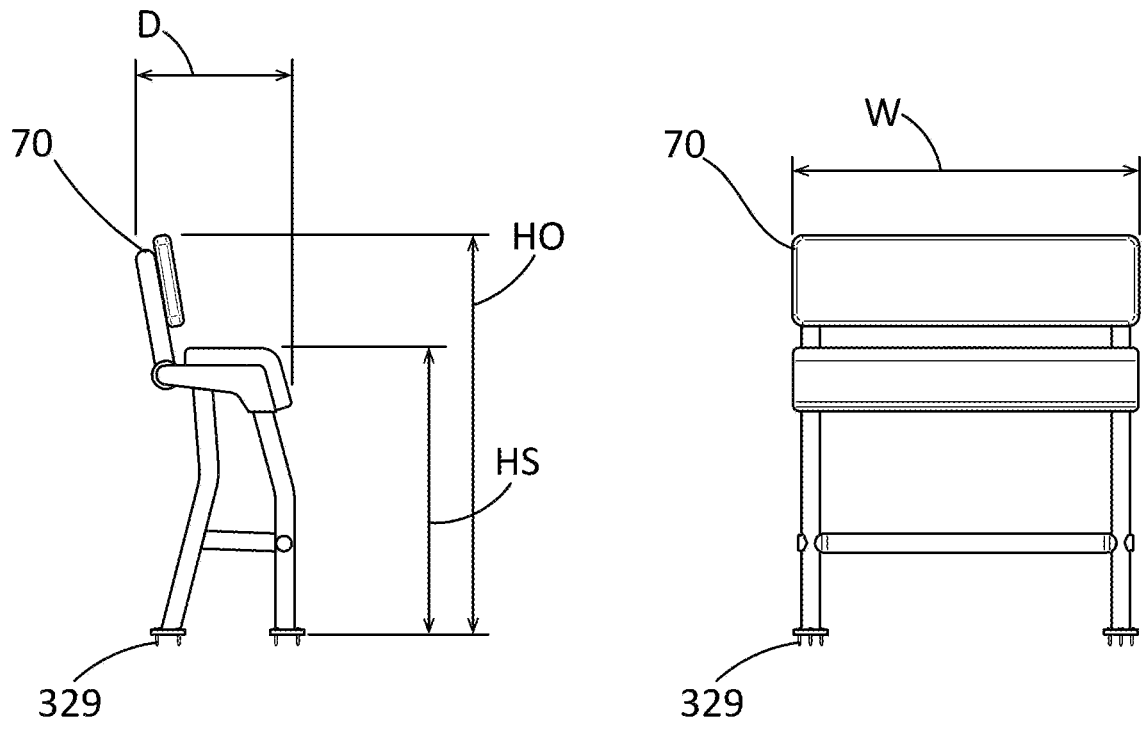
FIG. 2A
FIG. 2B
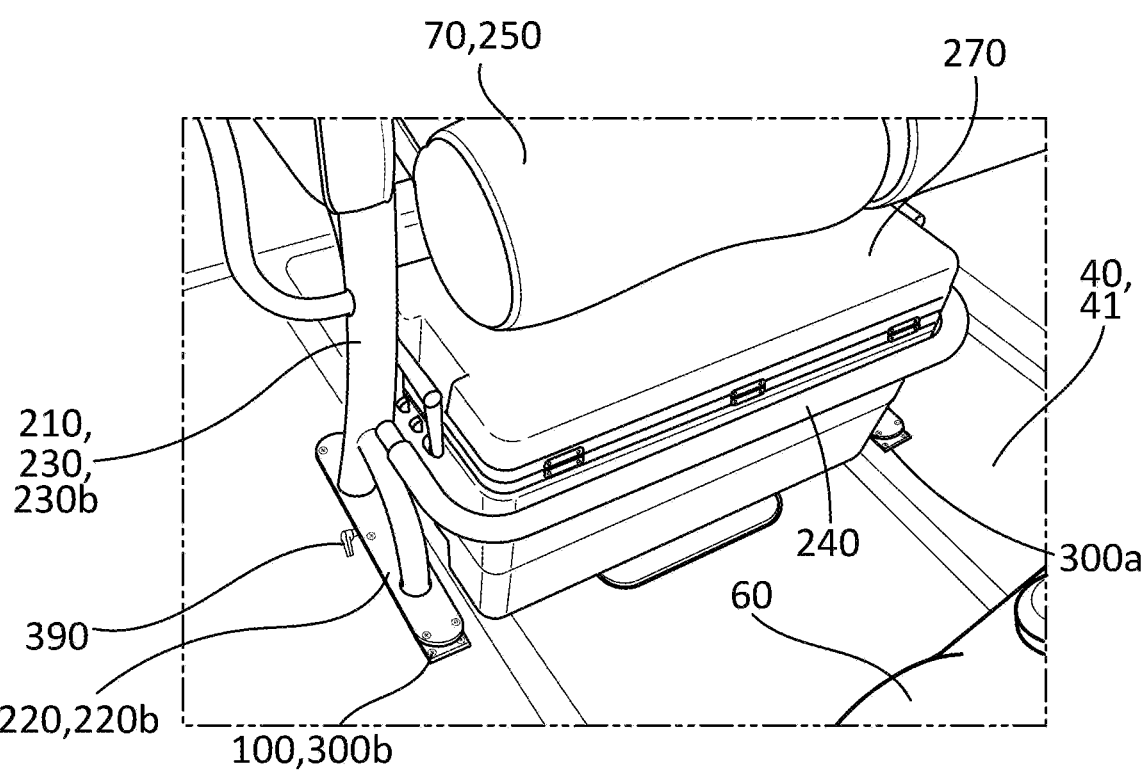
FIG. 2C 70,250,252    254

210,
230,
230b 390,
396

13B

13B

240

40,41

300a

60

100,300b 300,300b 390    320

1320

1390

1338

330    310

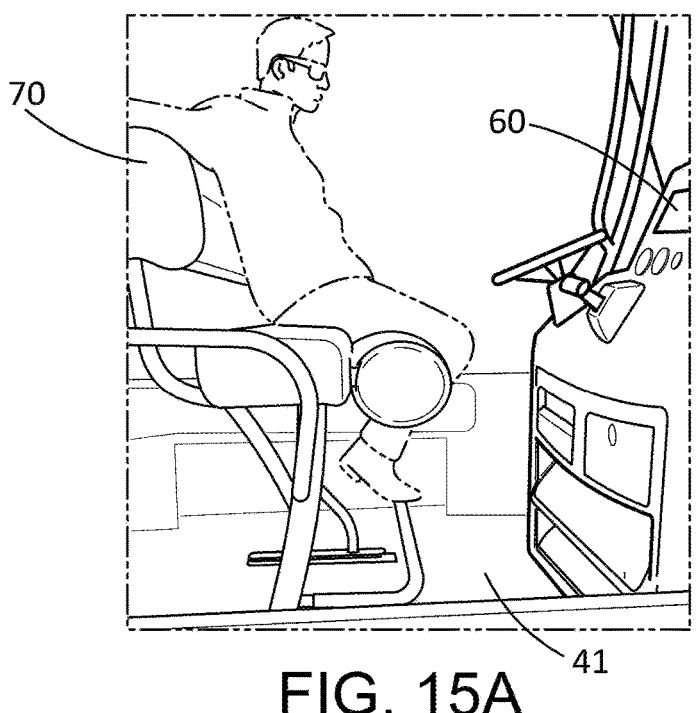
FIG. 15A
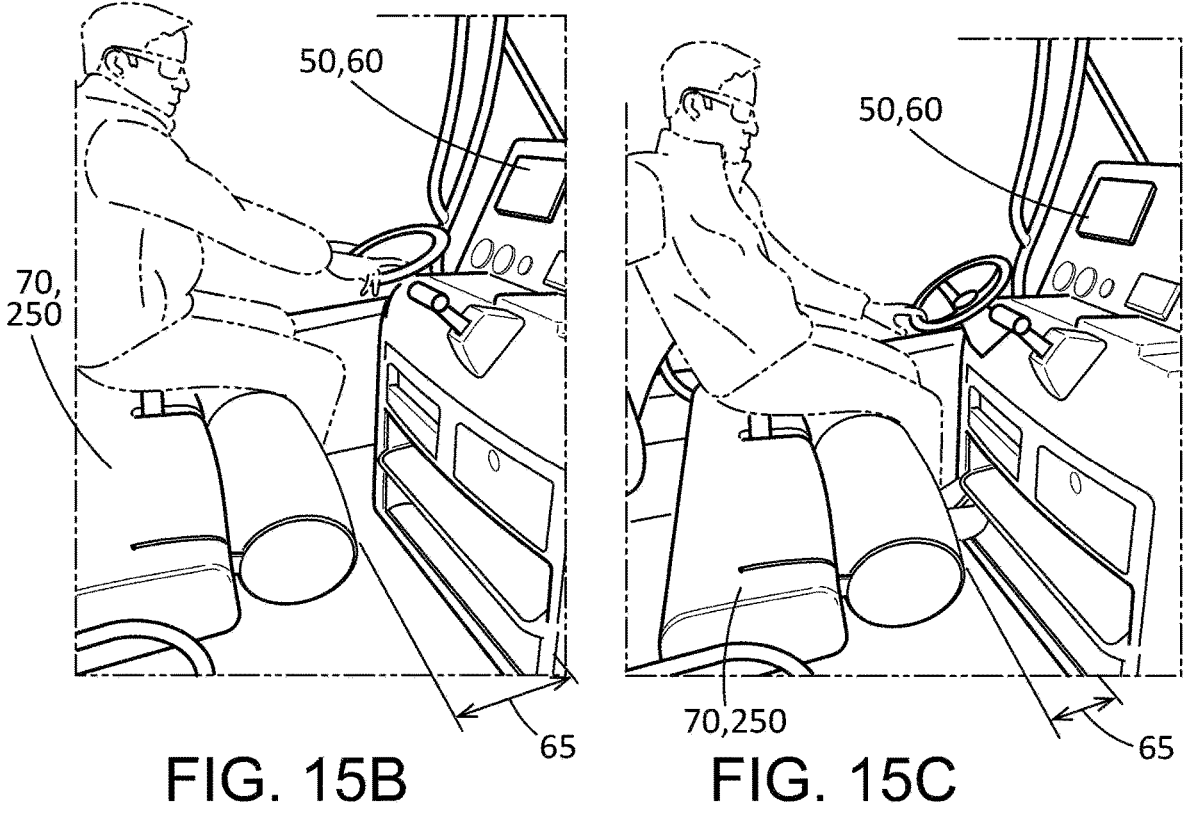
FIG. 15B          FIG. 15C

SEAT ADJUSTMENT SYSTEM

REFERENCE TO RELATED APPLICATIONS

This application claims the benefit of U.S. Provisional Application No. 63/332,854, filed Apr. 20, 2022, which is hereby specifically incorporated by reference herein in its entirety.

TECHNICAL FIELD

Field of Use

This disclosure relates to seat adjustment devices. More specifically, this disclosure relates to seat adjustment devices for seats, e.g., leaning posts, on boats.

Related Art

Marine vehicles (e.g., recreational boats) often include seats for users to use as support while driving the boat, entertaining, or for a variety of other purposes. Boats, however, do not typically allow for adjustment of such seats, and the seat adjustment mechanisms used on land vehicles (e.g., automobiles) differ in structure and functionality and would not be suited for use in a harsh marine environment. A boat will be exposed to salt water or at least water from the water in which it travels, from weather events, and from the activities of its users. In some aspects, a boat can be used simultaneously as a mode of transportation (while traveling), an animal hunting and dressing station (while fishing), a dining room (while eating), a play room (while entertaining), a garage (while storing various accessories, chemicals, and the like), a splash park (at least in effect), and more, and the fixtures and accessories generally need to survive extended exposure to each of these activities or environments as well as cleaning by chemicals and high-pressure water.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a system for a boat, the system comprising: a pair of seat rails configured to simultaneously couple the seat to a surface of the boat in any one of multiple positions in a longitudinal direction of the seat rails, the seat rails being parallel to each other when the seat is coupled to the surface.

In a further aspect, disclosed is a system comprising: a seat; and a pair of seat rails configured to simultaneously couple the seat to a floor of a boat in any one of multiple positions in a longitudinal direction of the seat rails, the seat rails being parallel to each other when the seat is coupled to the floor, the seat rails defining an open space between the seat rails unobstructed by the seat rails and sized to receive a stored item, the pair of seat rails configured to receive the stored item therebetween on the floor.

In yet another aspect, disclosed is a method of using a seat adjustment system for a boat, the method comprising: mounting a first portion of each of a pair of seat rails of the seat adjustment system to a floor of the boat; mounting a second portion of each of the pair of seat rails of the seat adjustment system to a seat of the boat, the seat positioned between a console of the boat and a stern of the boat; and mounting the second portion to the first portion, the second portion securable to the first portion in any one of multiple positions in a longitudinal direction of the pair of seat rails.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 2A is a side view of the leaning post of FIG. 1A in accordance with another aspect of the current disclosure.

FIG. 2B is a front view of the leaning post of FIG. 15A.

FIG. 2C is a top front perspective view of the leaning post of FIG. 1A showing a seat adjustment system securing the leaning post to a floor of the boat and comprising a pair of seat rails, each seat rail being in a non-extended position.

FIG. 100 is a top view of the rail block of FIG. 10A.

FIG. 15A is a side perspective view of the boat of FIG. 1A showing a user sitting in the leaning post thereof.

FIG. 15B is a side perspective view of the boat of FIG. 1A showing a user sitting in the leaning post thereof and with the leaning post in a first position.

FIG. 15C is a side perspective view of the boat of FIG. 1A showing a user sitting in the leaning post thereof and with the leaning post in a second position.

DETAILED DESCRIPTION

Figures 1A, 1B:
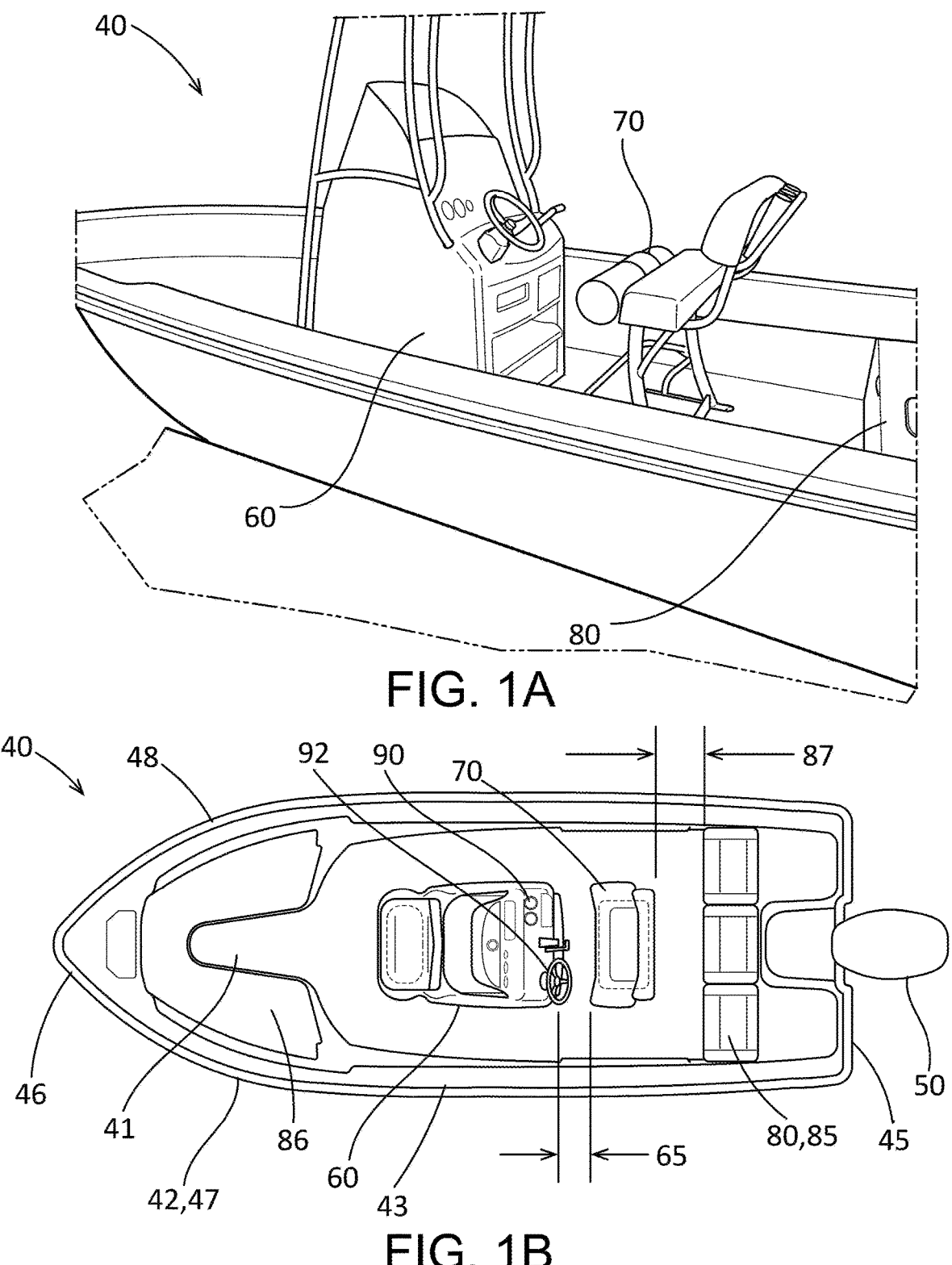
FIG. 1A is a side perspective view of a boat comprising a seat and, more specifically, a leaning post in accordance with one aspect of the current disclosure.
FIG. 1B is a top view of the boat of FIG. 1A.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a boat or a seat thereof nearest to and occupied by a user of the boat or seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In some aspects, a seat adjustment system and associated methods, systems, devices, and various apparatuses are disclosed herein. In some aspects, the seat adjustment system can comprise a first plate secured to a boat and a second plate secured to a seat and slideably coupled rail components therebetween.

Sometimes-conflicting interests of potential customers must be simultaneously considered and reconciled with each other when developing a new product. The development of marine vehicles, including recreational watercraft, is no exception. Some users or, more specifically, boaters are satisfied with or prefer a boat optimized for either fishing or else entertainment of friends and family. Because of financial, space, and time constraints and other considerations, however, many users prefer or require a boat that balances and accommodates both uses (i.e., fishing and entertainment) and more. Such users can therefore benefit from a boat that can quickly adapt to both uses.

More specifically, a boat optimized for fishing typically has little or no seating and is typically more open (and, in some aspects, free of seating on some or all sides) around a center console. The center console can comprise a steering wheel and various engine and other boat controls and, in some aspects, structures configured to protect against the sun and/or the elements generally. This otherwise open design maximizes fishability by allowing considerable freedom of movement around a cockpit or, more generally, an interior of the boat. Such a user may often and mainly use their boat for offshore fishing, but can also use their boat for fishing elsewhere as desired. A boat optimized for entertainment can, in contrast, comprise seating throughout (for example, on the sides, rear, and front of the boat) for a group of people to lounge upon and/or otherwise use. A boat can balance these two exemplary but common uses of fishing and entertainment (or any two uses with other needs) by incorporating some seating in a design defining also open areas around the boat.

Due to budget, space, and other considerations, some users can end up using a boat that, as built, does not meet their requirements in every way. Even though open space for maneuverability during fishing activities and also increased seating might be preferred, combining both in a larger boat can increase the cost of the boat exponentially. Adding mere inches or a few feet to increase versatility can result in a roomier boat but at many times the cost, especially beyond boat lengths of 20 feet. For example, a 23-foot-long boat can cost about $75K, but a 25-foot-long boat can cost about $135K.

Inevitably, the close quarters on a smaller boat can result in pinch points between the console and the seating. One of the more significant pinch points around the boat can be behind a leaning post on a family-friendly fishing craft. In addition, users themselves naturally vary in size—often being smaller or larger than the average person for which boats are designed—and can benefit from a seat and, more specifically, a leaning post that is adjustable.

More specifically, one or more of the following advantages can accompany a leaning post that is adjustable:

An adjustable leaning post can allow movement of the leaning post to a comfortable position for the driver, no matter the length of the trip;

An adjustable leaning post can enable the boater to maneuver the boat more safely;

An adjustable leaning post can enable the boater to operate the boat with less overall fatigue, especially on longer trips;

An adjustable leaning post can reduce or eliminate pinch points and allow for greater functionality such as, for example and without limitation, greater use of a space between a rear of the leaning post and the transom (i.e., rear) seat and/or boat transom (i.e., a vertical panel dividing the outside and inside of the boat at the stern);

An adjustable leaning post can facilitate a seamless transition from family-friendly entertainment mode to fishing mode;

An adjustable leaning post can eliminate the need for people sitting on the transom seat to have to slide over for people to pass by;

An adjustable leaning post can make it possible to hold more oversized items on the boat's transom (e.g., tubes or floats, coolers, and fuel bladders); and/or An adjustable leaning post can make it possible for users to experience the extra space of a larger boat without the added costs of owning a larger boat.

Realizing these and other benefits of an adjustable leaning post can, however, be difficult. Leaning posts are typically mounted directly to the deck or floor of the boat and incorporate no adjustment mechanism. So even though many smaller center-console boats have limited space between the rear seating and the fixed leaning post, which can make movement difficult during fishing activities and/or when people occupy the rear seating and/or are going in and out of a cooler at the rear of the boat, no provision is made in typical boats for this space to be adjusted.

It can be desirable to overcome the above challenges to create an adjustable leaning post that allows a boater to reconfigure space on a boat on any one of multiple seats and multiple boat models and manufacturers, and with a clear space between the seat rails, i.e., under the leaning post for storage. Disclosed below are various structures and methods for being able to adjust a seat.

FIG. 1A is a side perspective view of a marine vehicle, e.g., boat 40, and, more specifically, a motorboat in accordance with one aspect of the current disclosure. As such, the boat 40 can comprise a motor 50, which can be configured to propel the boat 40 through a body of water. In some aspects, the structures and methods disclosed herein can be used on any vehicle and not just the boat 40. The boat 40 can comprise a console 60, which can be a center console. The boat 40 can comprise a seat 70, which can be a leaning post as shown. The seat 70 can comprise a frame portion 210 and a seat portion 250, which can be secured to the frame portion 210. The seat portion can comprise a seat bottom 252 (shown in FIG. 13A) and a seat back 254 (shown in FIG. 13A). An inner surface of the seat back 254 configured to support a back of a user of the boat 40 and, more generally, the seat 70 can face forward. In some aspects, the seat back 254 can flip both forward and backwards, which can permit a user to sit either facing forwards or facing backwards.

FIG. 1B is a top view of the boat 40 of FIG. 1A. In some aspects, an overall length (length overall or LOA) of the boat 40 can be between 19 feet and 25 feet, inclusive, or between about 19 feet and about 25 feet, inclusive. Examples of manufacturers of the boat 40 can include Key West, NauticStar, Scout, Sea Fox, Sea Hunt, Sea Pro, and Tidewater. For example and without limitation, the boat 40 can be a Legacy model 2302 or 2402 from NauticStar.

The boat 40 can comprise outer seating 80, which can comprise rear outer seating 85 and front outer seating 86. The seat 70 can be offset from each of the console 60 and the outer seating 80 by respective distances 65 and 87. The seat 70 can be positioned between the console 60 and the outer seating 80. The console 60 can be secured to a deck or floor 41 of the boat 40 and can comprise steering controls 92, e.g., a steering wheel and other instruments 90. The instruments 90 can comprise measurement instruments and/or control instruments for checking and/or controlling various parameters of position and/or performance of the boat 40 such as, for example and without limitation, a position, orientation, or speed of the boat or conditions of or proximity to aspects of a surrounding environment. The boat 40 can further comprise a hull 42, which can define a stern 45, a bow 46, a port side 47, and a starboard side 48. In some aspects, as disclosed herein, a position of the seat 70 relative to any one or more of the console 60, the outer seating 80, the stern 45, and/or the bow 46 of the boat 40 can be selectively adjustable by a user of the boat 40. The floor 41 can extend at least from the rear outer seating 85 proximate to the stern 45 to the console 60. The floor 41 can further extend to the front outer seating 86 proximate to the bow 46. In some aspects, as shown, the floor 41 can extend to an interior wall defined by or proximate to a gunwale 43 of the boat 40.

Figures 15D, 15E:
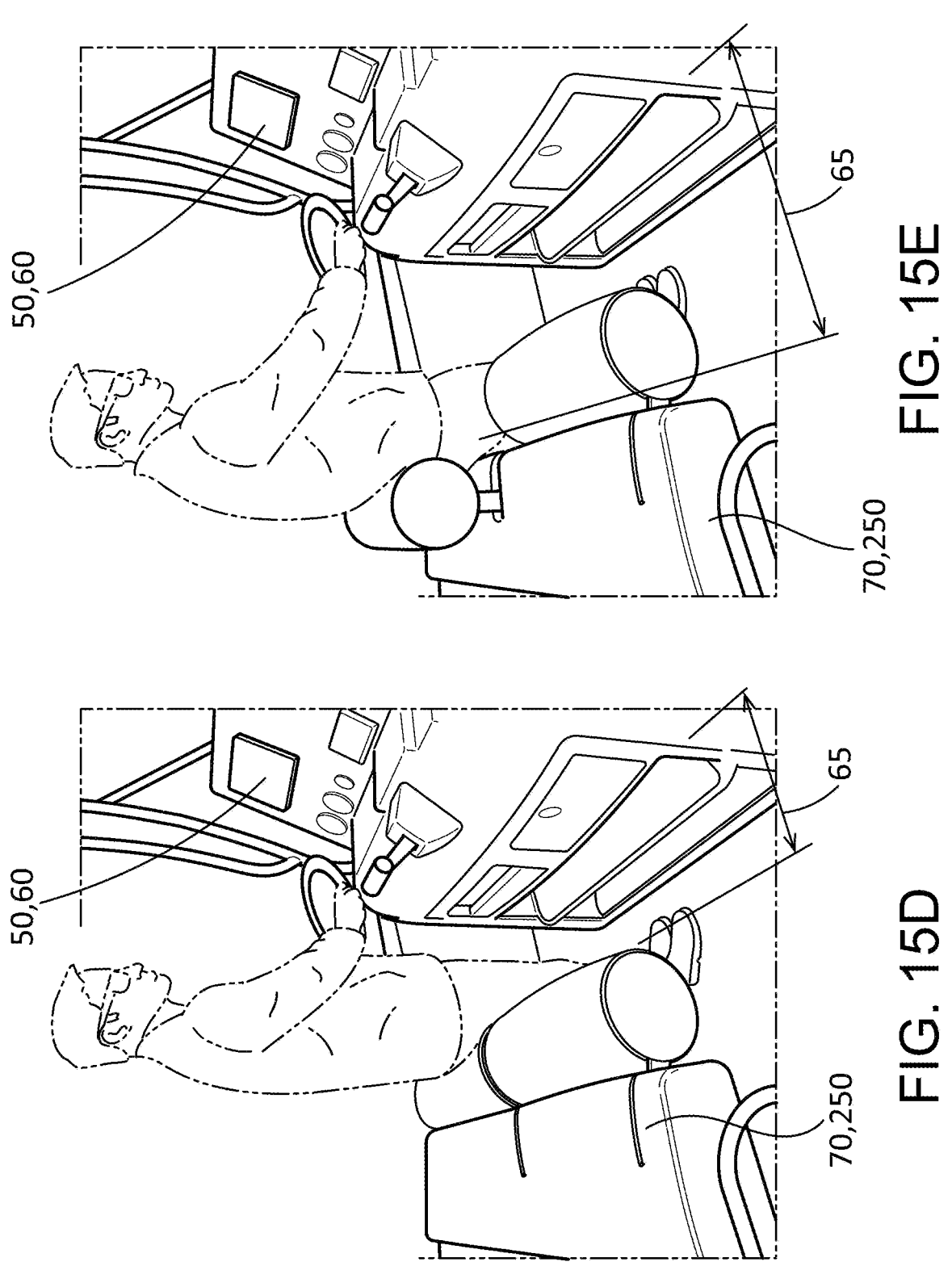
FIG. 15D is a side perspective view of the boat of FIG. 1A showing a user standing in front of the leaning post thereof and with the leaning post in a first configuration.
FIG. 15E is a side perspective view of the boat of FIG. 1A showing a user standing in front of the leaning post thereof and with the leaning post in a second configuration.

FIGS. 2A-2C are views of the seat 70 of FIG. 1A, which again can be a leaning post. FIG. 2A is, more specifically, a side view of the leaning post of FIG. 1A in accordance with another aspect of the current disclosure, and FIG. 2B is a front view of the leaning post of FIG. 2A. In some aspects, a width W (shown in FIG. 2B) of the seat 70 and, more specifically, the leaning post can measure between 30 inches and 40 inches, inclusive, and in some aspects can be an overall width including all hardware. In some aspects, a depth D of the seat 70 and, more specifically, the leaning post can measure between 17 inches and 24 inches, inclusive. In some aspects, an overall height HO of the seat 70 and, more specifically, the leaning post can measure between 44 inches and 50 inches, inclusive. In some aspects, a seat height HS of the seat 70 and, more specifically, the leaning post can measure between 30 inches and 35 inches, inclusive. In some aspects, the seat height HS can measure at least 31 inches. In some aspects, the seat 70 can be the leaning post when configured to support a body of the user (e.g., thighs or buttocks) when the user is standing between the seat 70 and facing the console 60, as shown in FIGS. 15D and 15E. In such aspects, the user can comfortably lean against the seat 70, hence the name "leaning post," and can thereby reduce fatigue and improve stability even during movement of the boat 40. In some aspects, dimensions of the seat 70 can be at least as shown, at most as shown, or as shown. In some aspects, the dimensions of the seat 70 can be otherwise.

FIG. 2C is a top front perspective view of the seat 70 of FIG. 1A. The frame portion 210 of the seat 70 can comprise a base 220 and a frame member 230, which can extend from the base 220 and can be oriented at an angle with respect to a longitudinal direction of the base 220. In some aspects, the frame member 230 can comprise individual legs, which can extend to separate bases 220 on one or both sides of the seat 70, and the bases 220 on the corresponding side need not be connected except through the frame member 230 (as shown in FIG. 2A). In some aspects, a cross member 240 can extend and can be secured to and extend from and between individual bases 210a,b or individual frame members 230a,b (230a shown in FIG. 14A) of the frame portion 210. The cross member 240 can, for example and without limitation, capture or limit movement of a stored item 270, e.g., a cooler shown, such that the stored item 270 is secured in a position under the seat 70 and prevented from contacting a user of the boat 40 positioned between the console 60 and the seat 70, especially during deceleration and/or other maneuvering of the boat 40. As shown, the seat 70 and the floor 41 can define an open space therebetween unobstructed by the seat rails 300a,b in an area between the seat rails 300a,b and shown occupied by the stored item 270.

As shown, a seat adjustment device or system 100 can secure the seat 70 to the floor 41 of the boat 40. The seat adjustment system 100 can comprise a pair of rail assemblies or seat rail assemblies or seat rails 300a,b. As shown, each seat rail 300a,b can be set in a non-extended position. Each of the pair of seat rails 300a,b can comprise the respective adjustment fastener 390, which can be loosened to facilitate adjustment of the corresponding seat rail 300a,b and can be tightened to facilitate locking of the corresponding seat rail 300a,b. As shown, the seat rails 300a,b can be independently adjusted.

Figure 3A:
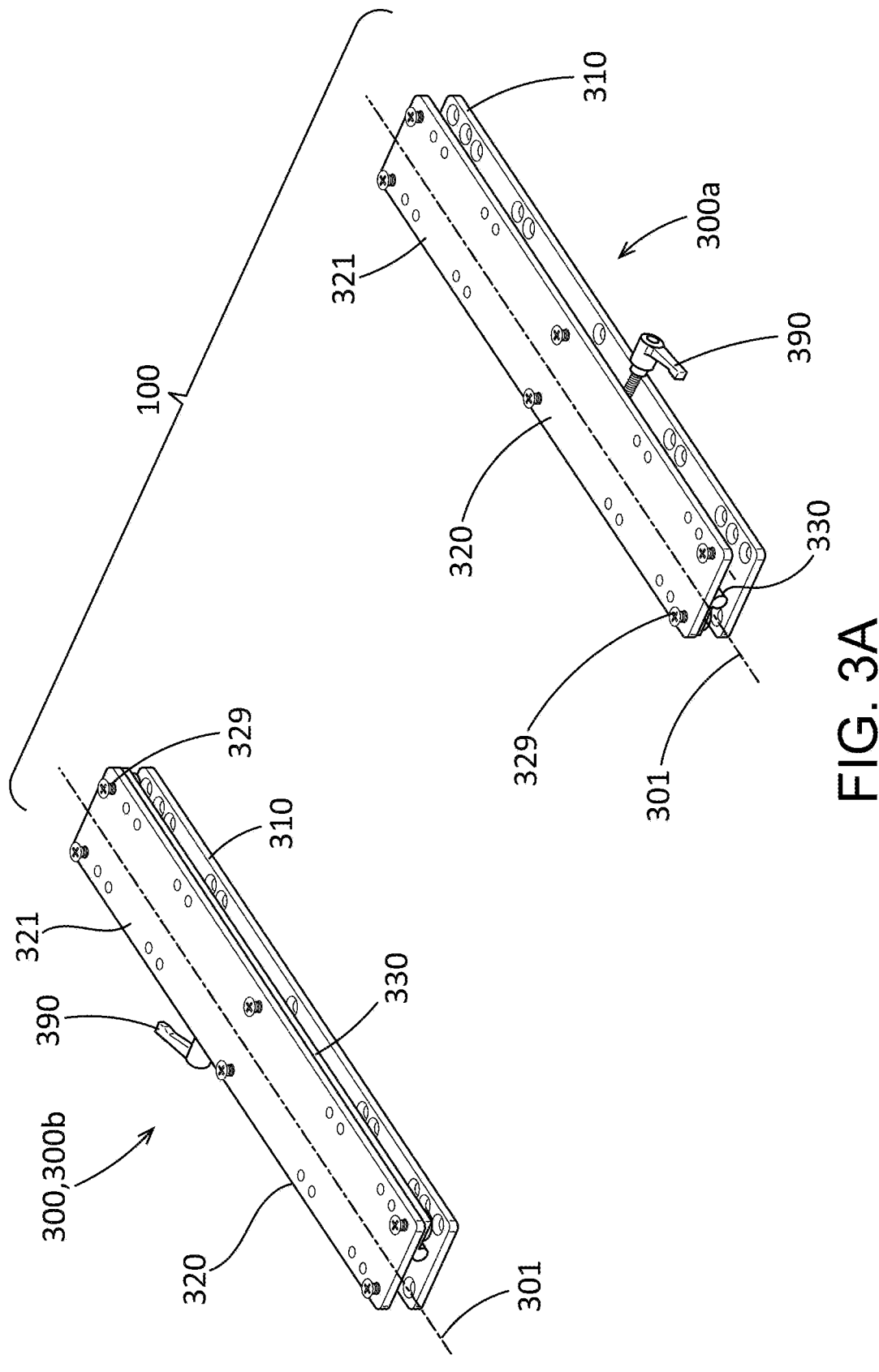
FIG. 3A is a top perspective view of the seat adjustment system of FIG. 2 showing the pair of seat rails thereof in a non-extended position.

FIG. 3A is a top perspective view of the seat adjustment system 100 of FIG. 2 showing the pair of seat rails 300a,b thereof in a non-extended position. In some aspects, as shown, the seat rails 300a,b can be identical to each other and can be a common seat rail 300. Each of the seat rails 300a,b can comprise a first plate or base plate or mounting plate 310. Each of the seat rails 300a,b can comprise a second plate or foot plate 320. Each of the seat rails 300a,b can comprise a plurality of rail blocks 340 (shown in FIG. 3C). Each of the seat rails 300a,b can comprise a rail member 330. Each of the seat rails 300a,b can comprise a rail brake 350 (shown in FIG. 4C). The seat rails 300a,b can be configured to simultaneously couple the seat 70 to the floor 41 (shown in FIG. 1B) of the boat 40 (shown in FIG. 1B). The seat rails 300a,b or, more specifically, a longitudinal axis or direction 301 thereof can be parallel to each other when the seat 70 is coupled to the floor 41. The seat rails 300a,b need not be connected to each other—except through the seat 40 and the floor 41—and in some aspects, as shown, will desirably not be connected to each other to leave space for storage under the seat 70 and/or for other benefits. In some aspects, the seat adjustment system 100 can comprise more than the two seat rails 300a,b. In some aspects, one or more of the seat rails 300 such as, for example and without limitation, a third seat rail (not shown) can be positioned parallel to the seat rails 300a,b and can itself support an item under the seat such as the stored item 270. Any of the mounting plate 310, the foot plate 320, the rail member 330, or another portion of the seat rails 300*a*,*b* can be a first portion or a second portion of one of the seat rails 300*a*,*b*.

The mounting plate 310 can be secured to the floor 41 of the boat 40 or to any surface of any vehicle configured to receive a seat such as, for example and without limitation, the seat 70. Any such surface can be a seat mounting surface. The mounting plate 310 can define holes defining multiple hole patterns, each hole pattern of the multiple hole patterns configured to secure the seat 70 to a different boat 40 or any one of different seats to the same boat 40. In some aspects, a version of the seat 70 not specifically configured for the boat 40 could still be used with the boat 40 through use of the seat adjustment system 100 disclosed herein.

The foot plate 320 can be secured to the seat 70 (removed for clarity in FIG. 3A but shown in FIG. 2). The foot plate 320 can define a flat upper surface 321. In some aspects, the foot plate 320 can be otherwise configured to receive a bottom surface of the base 220 (shown in FIG. 2) of the seat 70. The foot plate 320 can define holes to receive fasteners 329, which can removably secure the base 220 of the seat 70 to the corresponding seat rail 300*a*,*b*. In some aspects, the rail member 330 can be secured directly to the corresponding base 220 of the seat 70 without the foot plate 320 therebetween.

As will be described in further detail below, the rail blocks 340 can be secured or mounted to the mounting plate 310, the rail member 330 can be secured or mounted to the foot plate 320, and the rail brake 350 can be configured to fix a position of the foot plate 320 relative to the mounting plate 310 in the longitudinal direction 301 of the corresponding seat rail 300*a*,*b*. In some aspects, the rail member 330 and the foot plate 320 (or, in the case of that shown in FIG. 11, the rail member 330 and the mounting plate 310) can be formed or extruded from the same piece of metal as a monolithic component.

In some aspects, two or more components of the seat rails 300*a*,*b* can be removably secured to each other, to the boat 40, or to the seat 70 with removable fasteners. For example and without limitation, the foot plate 320 can be secured to the base 220 of the seat 70 with the fasteners 329, and the fasteners 329 can additionally secure the rail member 330 to the foot plate 320. In some aspects, two or more of the components of the seat rails 300*a*,*b* can be permanently secured to each other such as with weldments or welding.

Figures 3B, 3C:
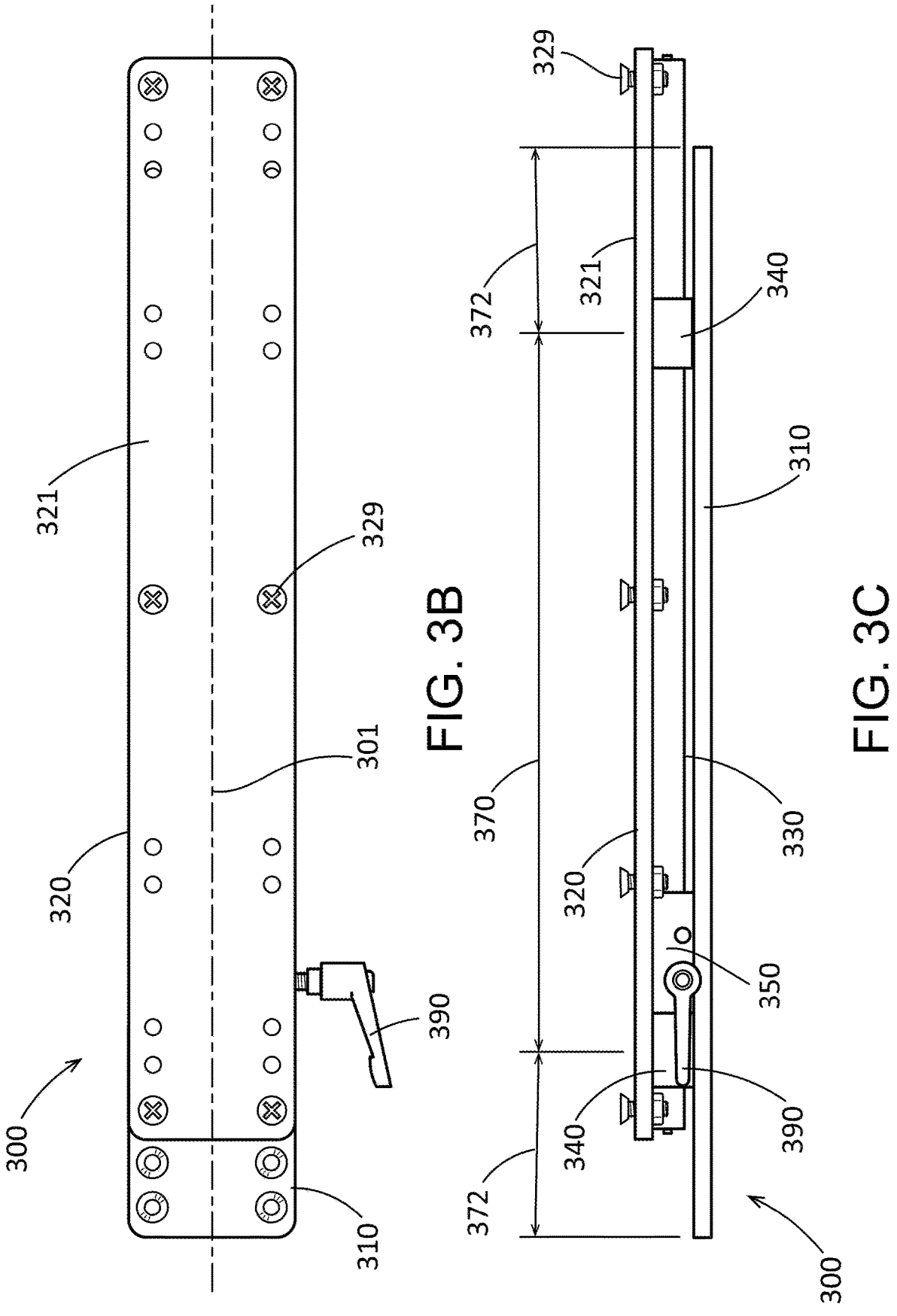
FIG. 3B is a top view of one of the pair of seat rails of FIG. 3A in a partially extended position.
FIG. 3C is a first side view of the seat rail of FIG. 3B.

FIG. 3B is a top view and FIG. 3C is a first side view of one of the pair of seat rails 300 of FIG. 3A in a partially extended position. Any one or more of a centerline, a first edge, and a second edge or, as shown, all three of the mounting plate 310 and the foot plate 320 can be aligned with each other. As shown, a pair of the rail blocks 340 can be spaced apart by a block spacing 370, and each rail block 340 can be offset from an end of the mounting plate 310 by an offset distance 372. In some aspects, the block spacing 370 can be at least 11.8 inches to minimize or eliminate rocking or pitching of the seat 70. Each rail block 340 can define a rail cavity 348 (shown in FIG. 5A) and can slidably receive the rail member 330 therein. Each of the fasteners 329—and one or more of other fasteners disclosed herein—can comprise a first portion and a second portion. The first portion can be a bolt or screw, and the second portion can be a nut. More specifically, the first portion can be a flat head screw, and the second portion can be a locknut and/or comprise a nylon insert to resist loosening.

Figures 4A, 4B:
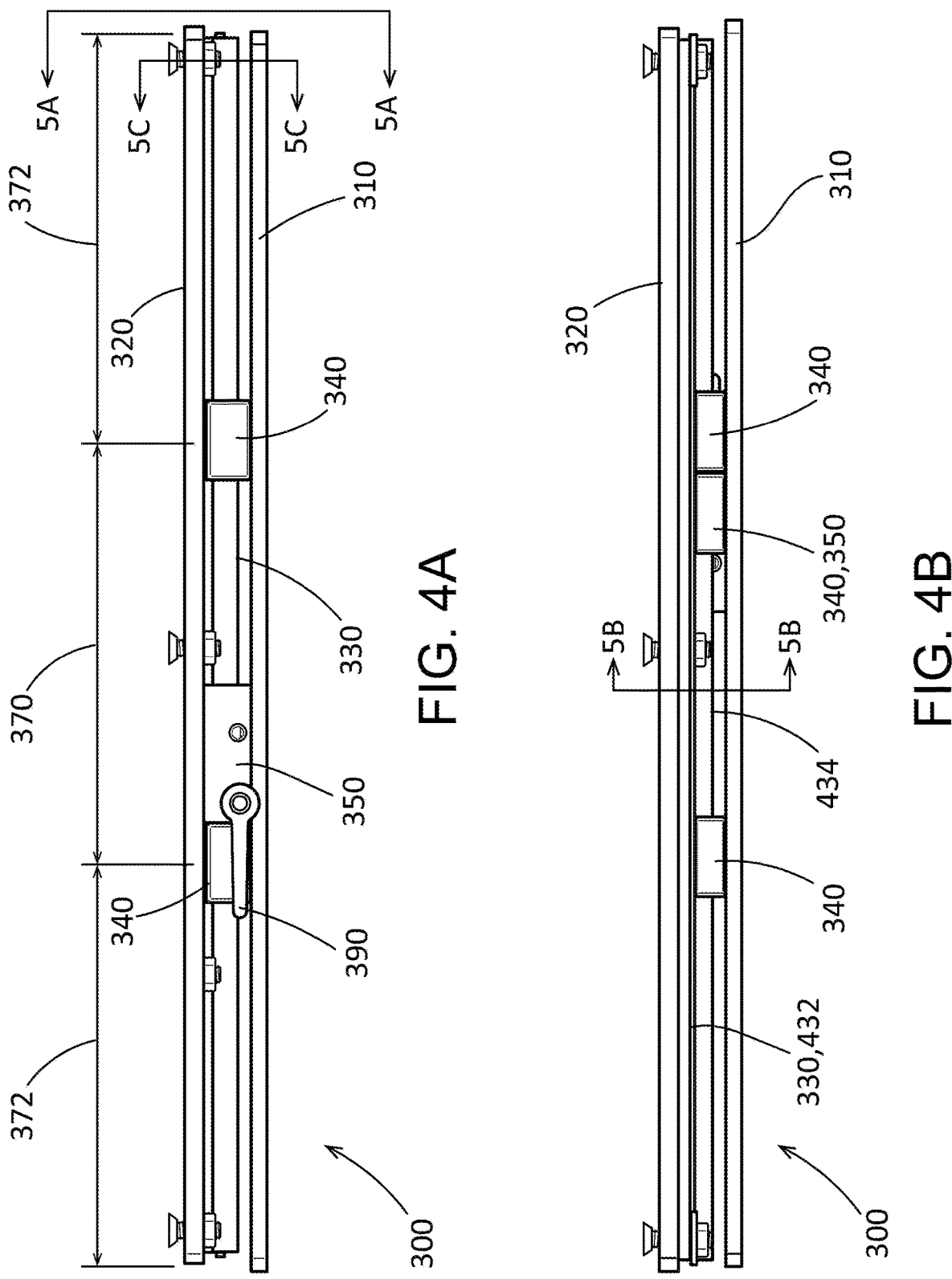
FIG. 4A is a first side view of the seat rail of FIG. 3B in a non-extended condition in accordance with another aspect of the current disclosure.
FIG. 4B is a second side view of the seat rail of FIG. 4A, the second side view showing a side of the seat rail that is opposite that shown in the first side view of FIG. 4A.
Figures 4C, 4D:
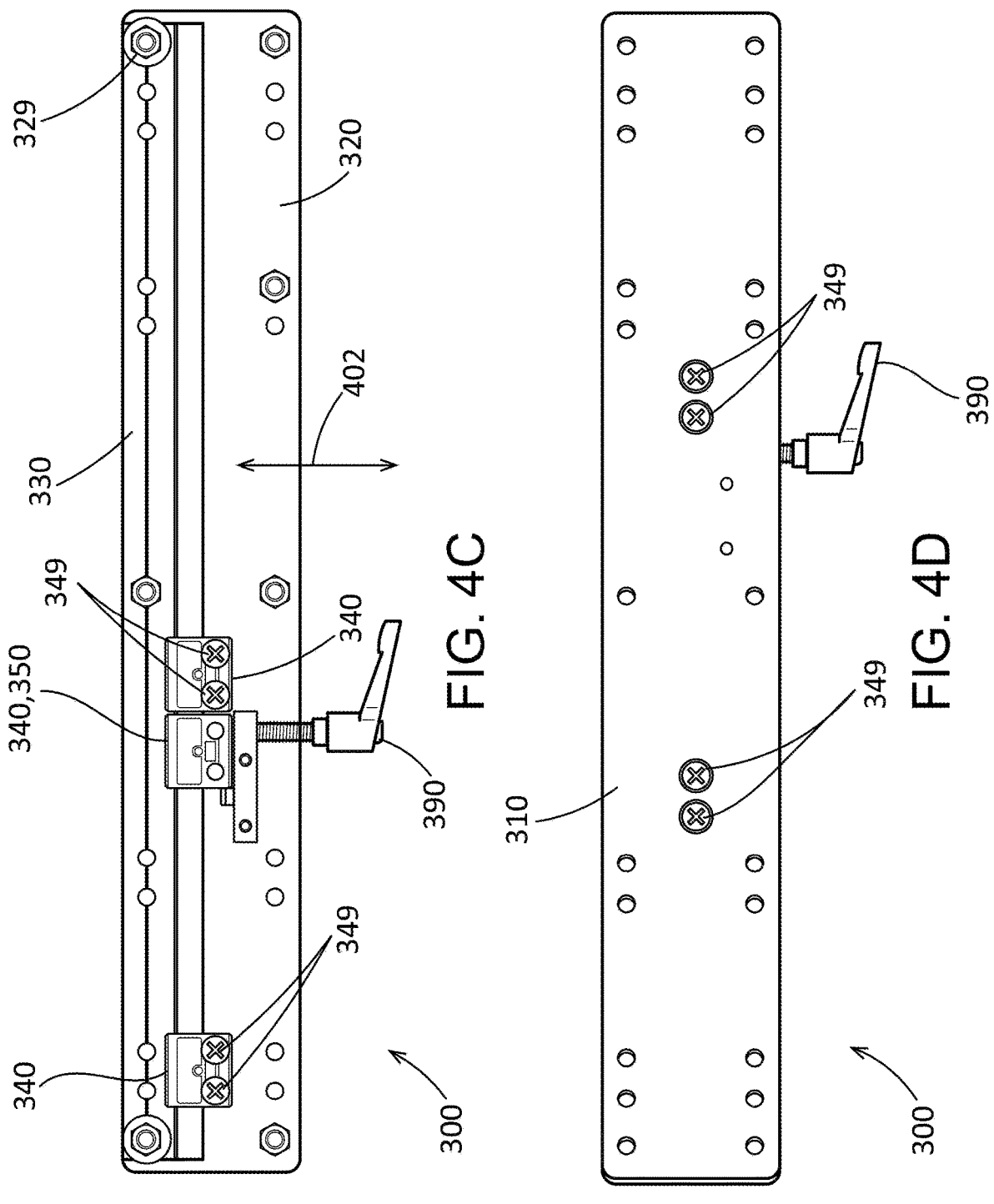
FIG. 4C is a bottom view of the seat rail of FIG. 4A with a mounting plate thereof removed for clarity.
FIG. 4D is a bottom view of the seat rail of FIG. 4A in accordance with another aspect of the current disclosure in which a position of an adjustment fastener is different than shown in FIG. 4A.

FIG. 4A is a first side view, FIG. 4B is a second side view, and FIGS. 4C and 4D are bottom views (in FIG. 4C, with a mounting plate thereof removed for clarity) of the seat rail 300 of FIG. 3B in a non-extended condition in accordance with another aspect of the current disclosure. As shown in FIGS. 4A and 4B, the block spacing 370 can be less than shown in FIG. 3C. In some aspects, increasing (or decreasing) the block spacing 370 can reduce (or increase) the degree of adjustability of the seat rails 300 (e.g., an overall adjustment distance 1470 shown in FIG. 14A). As shown throughout, the rail member 330 can comprise a mounting portion 432, which can be a flange, and a slide portion 434. The slide portion 434 can extend from the mounting portion 432.

As shown in FIG. 4C, the adjustment fastener 390 can be configured to tighten against the rail brake 350, which can as a result begin to bind against the slide portion 434 of the rail member 330 in a transverse direction 402 thereof and thereby lock a position of the foot plate 320 and, more generally, the seat 70 with respect to the mounting plate 310 and, more generally, the boat 40. In some aspects, as shown, the foot plate 320 can be offset with respect to the mounting plate 310 by any degree and, more specifically, in any position in a longitudinal direction of the seat rail 300, at least within a predetermined adjustment range based on the geometries of the components of the seat rail 300. More specifically, the rail brake 350 need not include, and in some aspects may desirably not include, an indexing feature (e.g., with fasteners and mating detents) or positive lock between the parts beyond mere friction. In other aspects, the rail brake 350 can include an indexing feature or such a lock beyond mere friction between surfaces. In some aspects, one or more components can define markings, which can aid a user in adjusting the seat rails 300*a*,*b* and, more generally, the seat 70 fore or aft (or in any desired direction in which the seat 70 may be installed) by the same degree, with or without the use of detents. As shown in FIG. 4D, in accordance with another aspect of the current disclosure, the adjustment fastener 390 can be positioned in a different position along a longitudinal length of the seat rail 300.

Figures 5A, 5B, 5C:
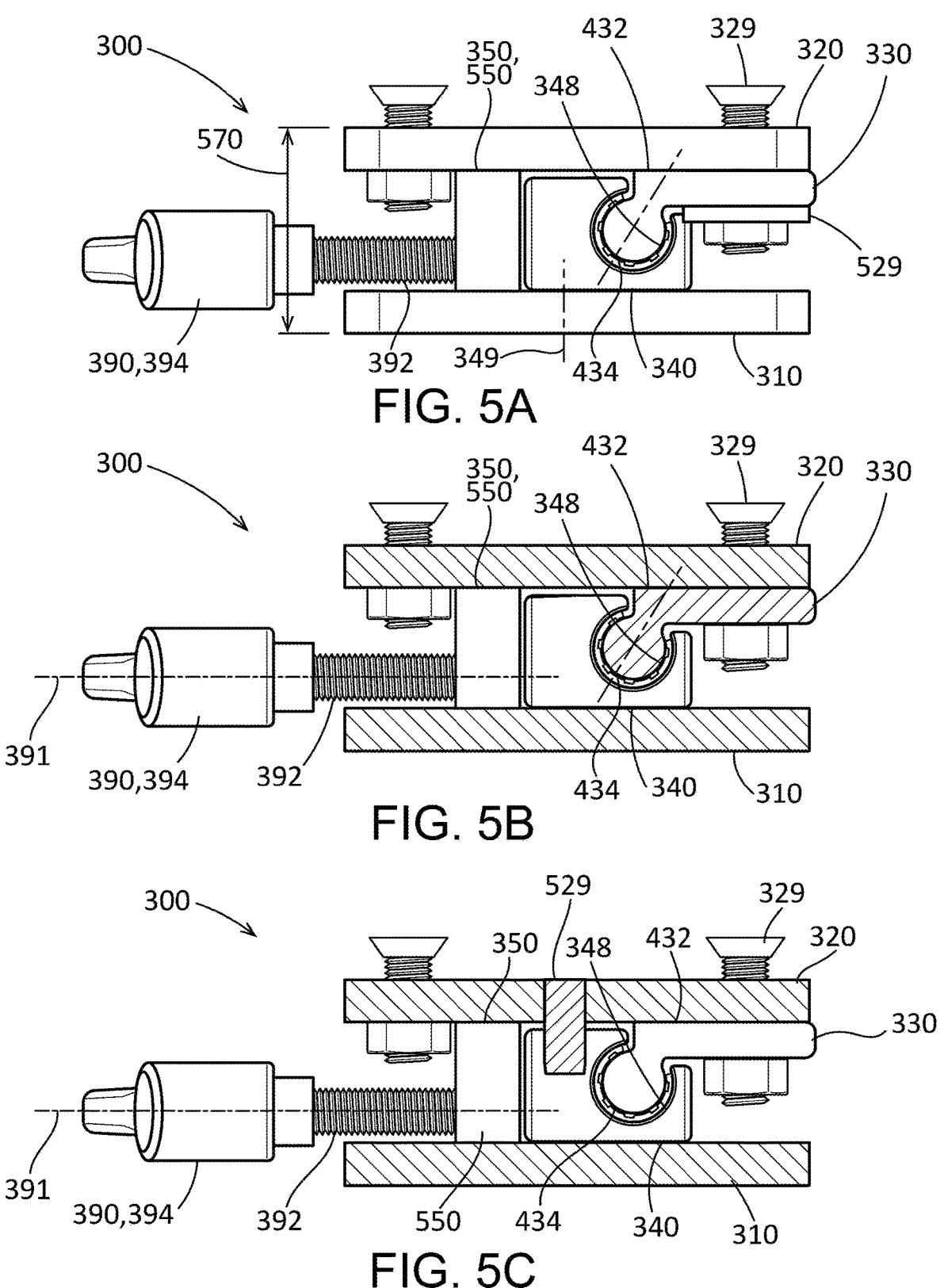
FIG. 5A is a front view of the seat rail of FIG. 4A taken from line 5A-5A of FIG. 4A.
FIG. 5B is a sectional view of the seat rail of FIG. 4A taken from line 5B-5B of FIG. 4B.
FIG. 5C is a sectional view of the seat rail of FIG. 4A taken from line 5C-5C of FIG. 4A in accordance with another aspect of the current disclosure in which a stop of the seat rail comprises a pin.

FIG. 5A is a front view of the seat rail 300 of FIG. 4A taken from line 5A-5A of FIG. 4A. As shown, the rail brake 350 can comprise a brake block 550 and the adjustment fastener 390. In some aspects, the rail member 330 can be or can comprise Part No. WS-10-460 from Igus, Inc. of Rumford, Rhode Island, USA. In other aspects, the rail member 330 can be sourced elsewhere and can define another shape and/or other proportions. In some aspects, meanwhile, each of the rail blocks 340 can be or can comprise Part No. WJUM-01-10 from Igus, Inc. In other aspects, the rail blocks 340 can be sourced elsewhere and can define another shape and/or other proportions that are complementary to the cross-sectional shape of the rail member 330. The fasteners 349 can be flat head screws and can be sized to be received within the mounting plate 310 and the corresponding rail blocks 340. The fasteners 349 can thereby secure the rail blocks 340 to the mounting plate 310.

The mounting portion 432 of the rail member 330 can face and can be secured to a lower surface 322 of the foot plate 320. The slide portion 434 (shown in FIG. 5A) can extend from the mounting portion 432 at an angle from the vertical. In some aspects, for example, a line extending through a center of a connection between the mounting portion and the slide portion 434 and through a center of the slide portion 434 (e.g., a diameter thereof) can, as shown in FIG. 5A, be angled with respect to a vertical direction and a horizontal direction of the seat rail 300. In cross-section, each of the slide portion 434 and the rail cavity 348 can define a shape that is at least in part circular or radiused. An insert received within the rail block 340 can define the rail cavity 348 and can facilitate both smooth movement of the rail member 330 with respect to the rail blocks 340 and can facilitate locking of the rail member with respect to the rail brake 350 upon the aforementioned tightening of the adjustment fastener 390.

As shown, the rail member 330 or, more generally, the seat rail 300 can comprise a stop 529. In some aspects, the stop 529 can be positioned between a first portion, e.g., a screw, and a second portion, e.g., a nut, of the fastener 329. More specifically, the stop 529 can be or can comprise a washer. In some aspects, the stop 529 can be positioned elsewhere on the rail member 330 or, more generally, on the seat rail 300. Interference between the stop 529 and the rail blocks 340 can prevent movement of the foot plate 320 past the rail blocks 340. In some aspects, the adjustment fastener 390 can be or can comprise Part No. 6320K17 from McMaster-Carr of Chicago, Illinois, USA. More specifically, the adjustment fastener 390 can comprise a first portion or threaded portion 392 and a second portion or handle portion 394. By use of a lever or a knob, which can be knurled or can comprise lobes extending in a radial direction of the second portion 394, the second portion 394 can be configured to be tightened by hand and without tools. More specifically, the second portion 394 and, more generally, the adjustment fastener 390 can be configured to be fully tightened—sufficient to lock the rail brake 350 during maximum acceleration or deceleration of the vehicle—by hand and without tools. In some aspects, the second portion 394 can be or can comprise an "L" handle defining an asymmetric L-shape. In some aspects, the second portion 394 of the adjustment fastener 390 can be any simple fastener head configured to be tightened. The seat rail 300 can define an overall assembled height 570.

FIG. 5B is a sectional view of the seat rail 300 of FIG. 4A taken from line 5B-5B of FIG. 4B. As shown, the rail brake 350 can comprise the brake block 550, the adjustment fastener 390, and a floating rail block 340, which can be in a floating condition without any fasteners such as the fastener 349. As also shown, the stop 529 of the seat rail 300 can comprise a pin. Upon tightening of the adjustment fastener 390, which can move the adjustment fastener 390 towards the floating rail block 340 and the rail member 330 in an axial direction with respect to a fastener axis 391, the first portion or threaded portion 392 thereof can be configured to threadably engage with the brake block 550 and push the floating rail block 340 against the rail member 330. More specifically, the first portion 392 can contact an outer surface of the floating rail block 340 and thereby push the floating rail block 340 against the rail member 330. The resulting side force against the rail member 330 can effectively bind, via friction, the rail member and prevent movement of the rail member—and the foot plate 320—with respect to the mounting plate 310. As shown, the mounting plate 310 and the foot plate 320 can be parallel to each other and to each of the other components or portions thereof. In some aspects, as shown, the adjustment fastener 390 can be closer to the mounting plate 310 than the foot plate 320. In other aspects, the adjustment fastener 390 can be closer to the foot plate 320. In some aspects, the second portion 394 of the adjustment fastener 390 can be in a horizontal orientation or even touching the floor 41 (shown in FIG. 1B) when the rail brake 350 is in a fully locked condition.

In some aspects, by way of analogy, the rail brake 350 can function as a brake pad (e.g., the brake pad of an automobile of older vintage) or brake lock when the adjustment fastener 390 is tightened. More specifically, the rail brake 350 can fix a position of the foot plate 320 with respect to the mounting plate 310 in a longitudinal direction of the seat rail 300. In some aspects, as shown, the fastener axis 391 can be parallel to either or both of an orientation of the plates 310,320 and the floor 41 (shown in FIG. 1B).

FIG. 5C is a sectional view of the seat rail 300 of FIG. 4A taken from line 5C-5C of FIG. 4A in accordance with another aspect of the current disclosure. As shown, the stop 529 of the seat rail 300 can comprise a pin. More specifically, the stop 529 can extend through the foot plate 320 and can be angled with respect to the foot plate. In some aspects, as shown, the pin can be solid. In some aspects, the pin can be hollow (e.g., a spring pin).

Figure 5D:
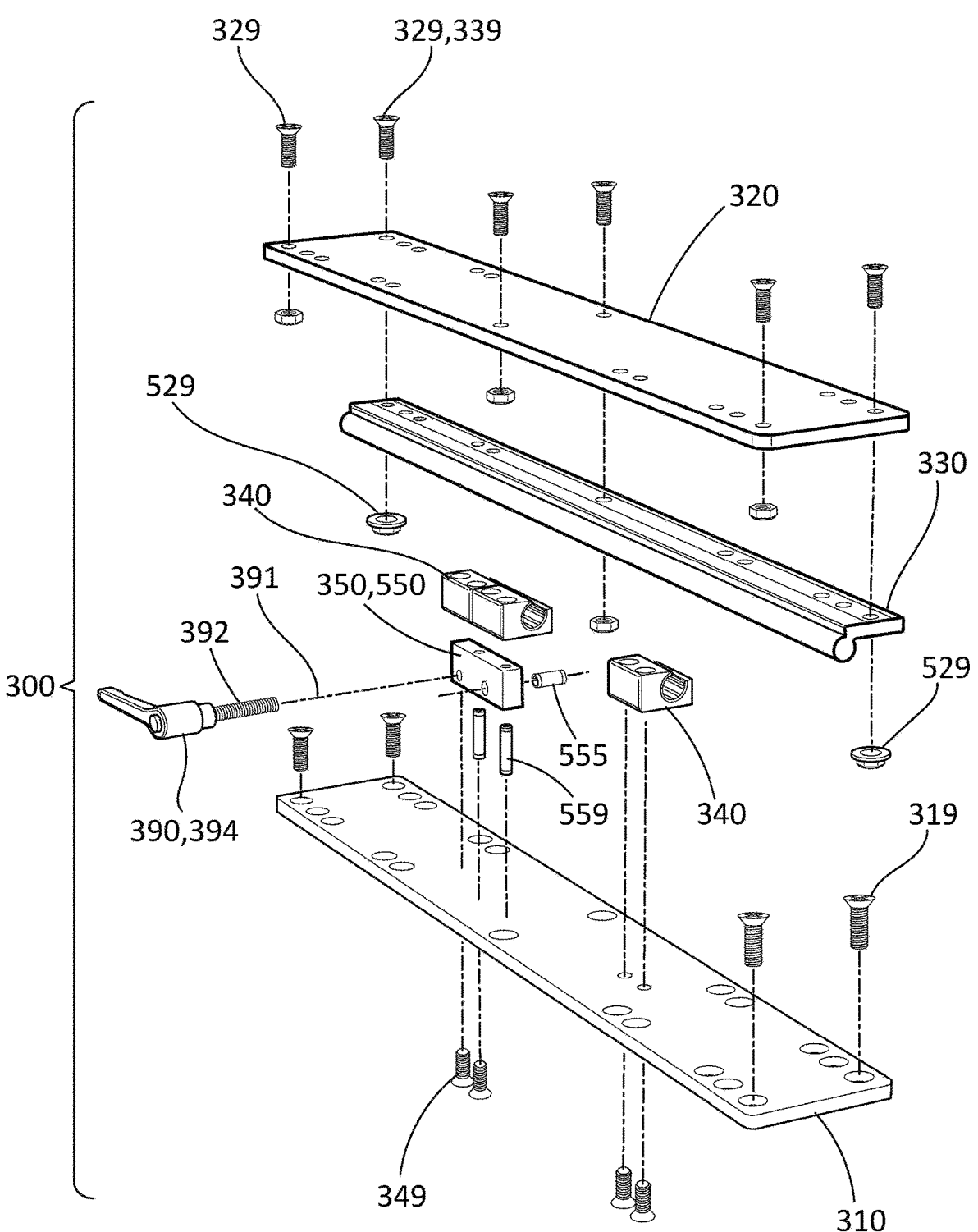
FIG. 5D is an exploded perspective view of the seat rail of FIG. 4A.

FIG. 5D is an exploded perspective view of the seat rail 300 of FIG. 4A. The rail member 330 can be secured to the foot plate 320 with fasteners 339 to form one half of the seat rail 300. In some aspects, as shown, one or more of the fasteners 339 and the fasteners 329 can be the same fasteners in that the same fasteners 329 can secure the foot plate 320 to the base 220 of the seat 70 and also the rail member 330 to the foot plate 320—and a length of the fasteners 329,339 adjusted accordingly, as shown. The rail blocks 340 and the rail brake 350 can be secured, at least in part, to the mounting plate 310 with the fasteners 349,390,559 to form another half of the seat rail 300. More specifically, the brake block 550 can be secured in position with respect to the mounting plate 310 with one or more fasteners 559, which can be pins and, more specifically, spring pins. In some aspects, the rail brake 350 can be secured, at least in part, to whatever portion of the corresponding seat rail 300 the rail blocks 340 are secured. In some aspects, the rail brake 350 can comprise a stop 555, which can be secured to the brake block 550. More specifically, the stop 555 can be a pin and, more specifically, a spring pin. The floating rail block 340 of the rail brake 350 can be slidably received therebetween the mounting plate 310 and the seat plate 320 to facilitate adjustment of the seat rail 300. The stop 555, which can be a pin, can help maintain a position of the floating rail block 340 proximate to the adjustment fastener 390 as the seat adjustment system 100 is adjusted by moving the seat 70. In some aspects, the adjustment fastener 390 can itself help maintain a position of the floating rail block 340 with respect to the adjustment fastener 390 and in some aspects, for example and without limitation, can be received within a detent or other feature defined by a surface of the floating rail block 340 facing the adjustment fastener 390. The entire seat rail 300 can be secured to a mating structure, e.g., the boat 40 (shown in FIG. 1B), by fastening the mounting plate 310 thereto with fasteners 319, only representatively shown.

Figures 6A, 6B:
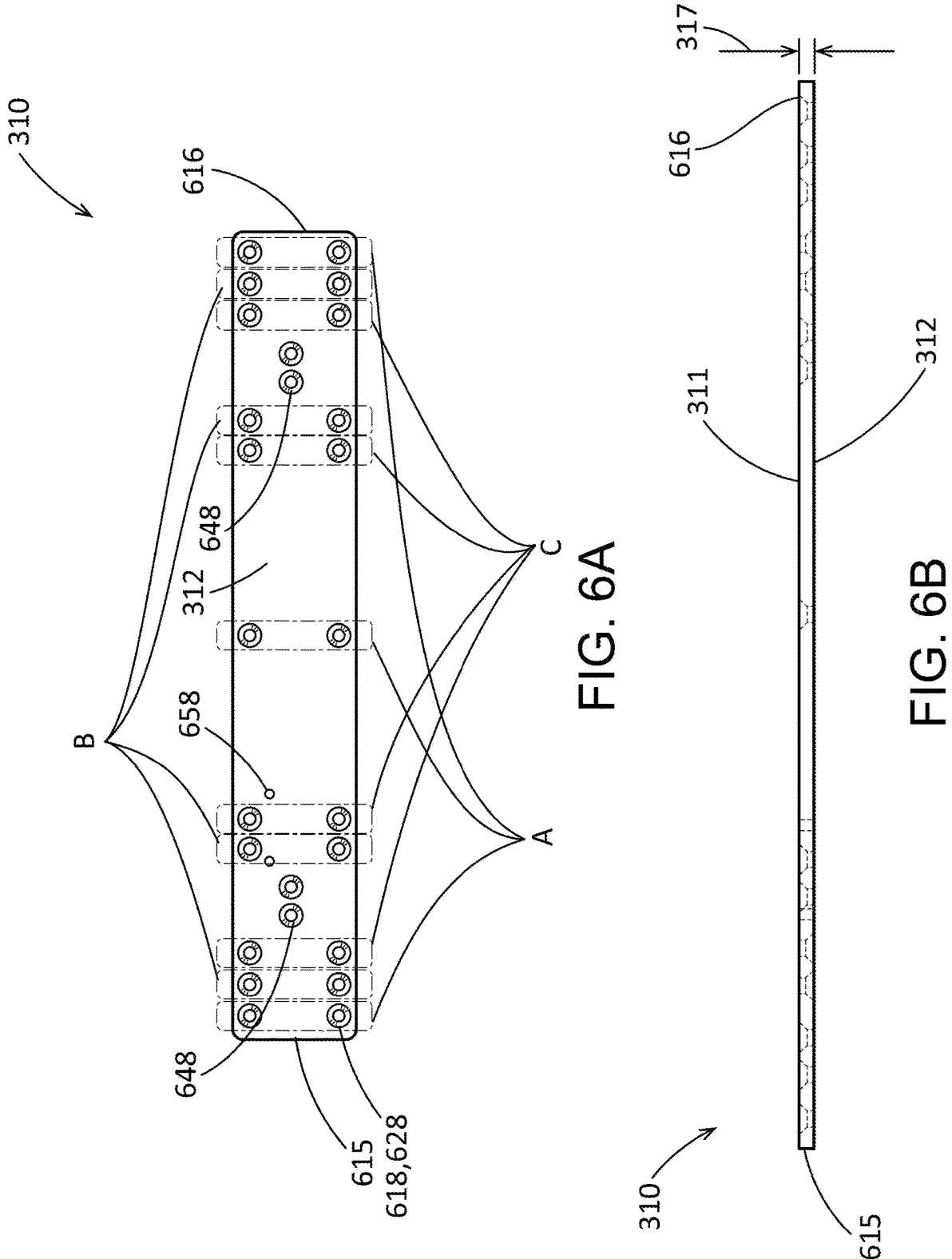
FIG. 6A is a bottom view of a mounting plate of the seat rail of FIG. 3B.
FIG. 6B is a side view of the mounting plate of FIG. 6A.

FIG. 6A is a bottom view and FIG. 6B is a side view of the mounting plate 310 of the seat rail 300 of FIG. 3A. The mounting plate 310 can define openings or holes 618 for removably securing the mounting plate 310 and, more generally, the seat rail 300, to a mating structure such as the floor 41 (shown in FIG. 1B) of the boat 40 (shown in FIG. 1B). The openings or holes 618, any of which can be slotted or elongated to accommodate additional adjustment or compatibility, can define multiple hole patterns 628 or more specifically, hole patterns A,B,C, each of which can define a rectangular array of the holes 618. Each hole pattern 628 or hole pattern A,B,C can match a corresponding hole pattern on the mating structure, e.g., the boat 40. For example and without limitation, a hole pattern A can match a corresponding hole pattern on a mating structure on a first set of boats 40 such as those from a first manufacturer, e.g., NauticStar; a hole pattern B can match a corresponding hole pattern on a mating structure on a second set of boats 40 such as those from a second manufacturer, e.g., Key West; and a hole pattern C can match a corresponding hole pattern on a mating structure on a third set of boats 40 such as those from a third manufacturer, e.g., Sea Pro. The mounting plate 310 can define openings or holes 648, which can receive the fasteners 349 (shown in FIG. 5D) for securing the rail blocks 340 (shown in FIG. 5D) to the mounting plate 310. As shown, the holes 618,648 can be countersunk to allow flush mounting of fasteners such as, for example and without limitation, the fasteners 319,349 (shown in FIG. 5D) with the respective surfaces 311,312. The mounting plate 310 can define openings or holes 658, which can receive the fasteners 559 for securing the brake block 550 to the mounting plate 310. As shown in FIG. 6B, the mounting plate 310 and one or more surfaces thereof can be planar or flat as shown and can define a thickness 317, which can be constant from a first end 615 to a second end 616. In some aspects, dimensions of the mounting plate 310 can be at least as shown, at most as shown, or as shown. For example and without limitation, the holes 618 in the hole pattern A can be spaced apart by a distance in the longitudinal direction 301 (shown in FIG. 3A) measuring 8.5 inches, the holes 618 in the hole pattern B can be spaced apart by respective shorter and longer distances in the longitudinal direction 301 measuring 3 inches and 9.5 inches, and the holes 618 in the hole pattern C can be spaced apart by respective shorter and longer distances in the longitudinal direction 301 measuring 3 inches and 8.25 inches. In some aspects, the dimensions of the mounting plate 310 can be otherwise.

Figures 7A, 7B:
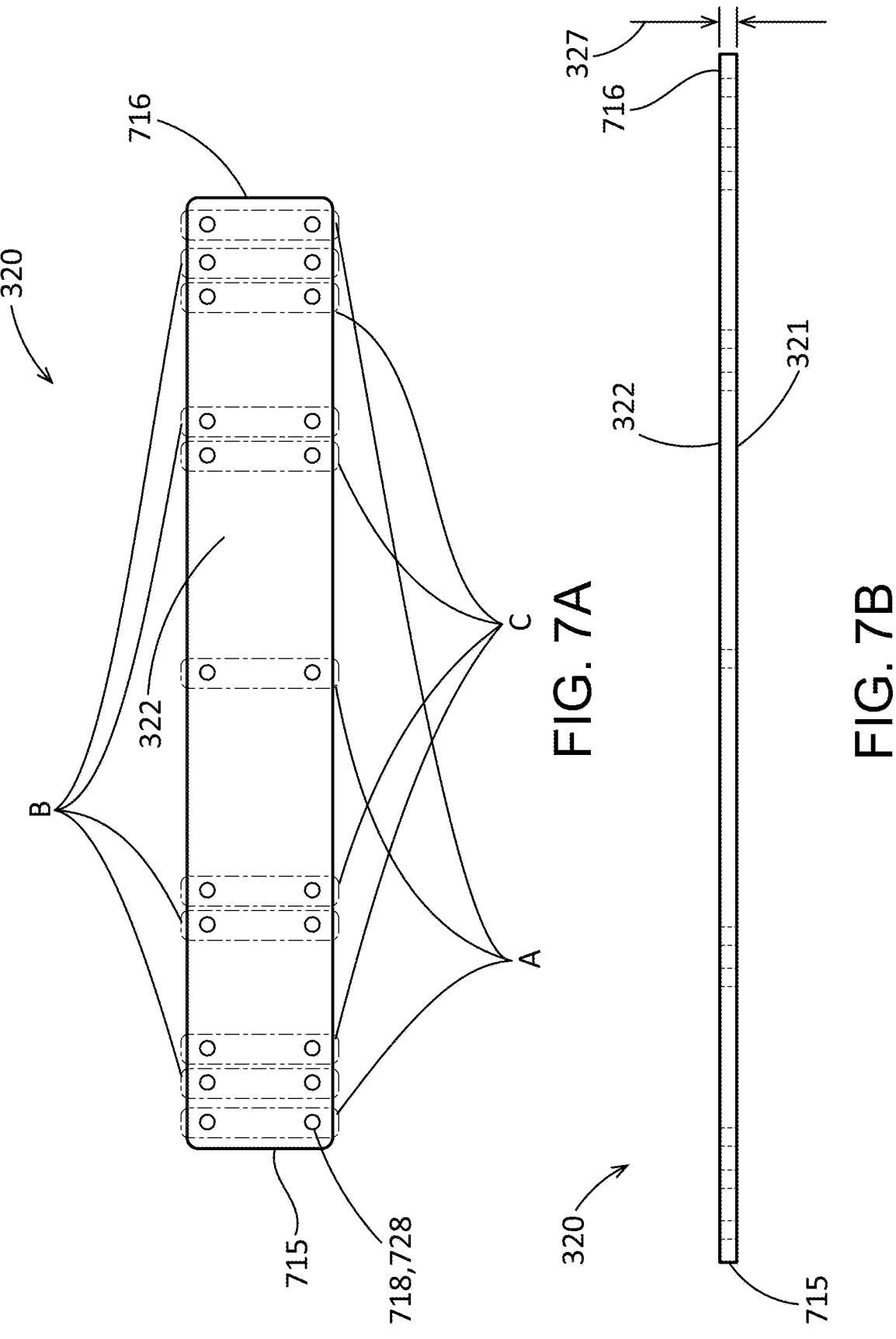
FIG. 7A is a top view of a foot plate of the seat rail of FIG. 3B.
FIG. 7B is a side view of the foot plate of FIG. 7A.
Figure 11:
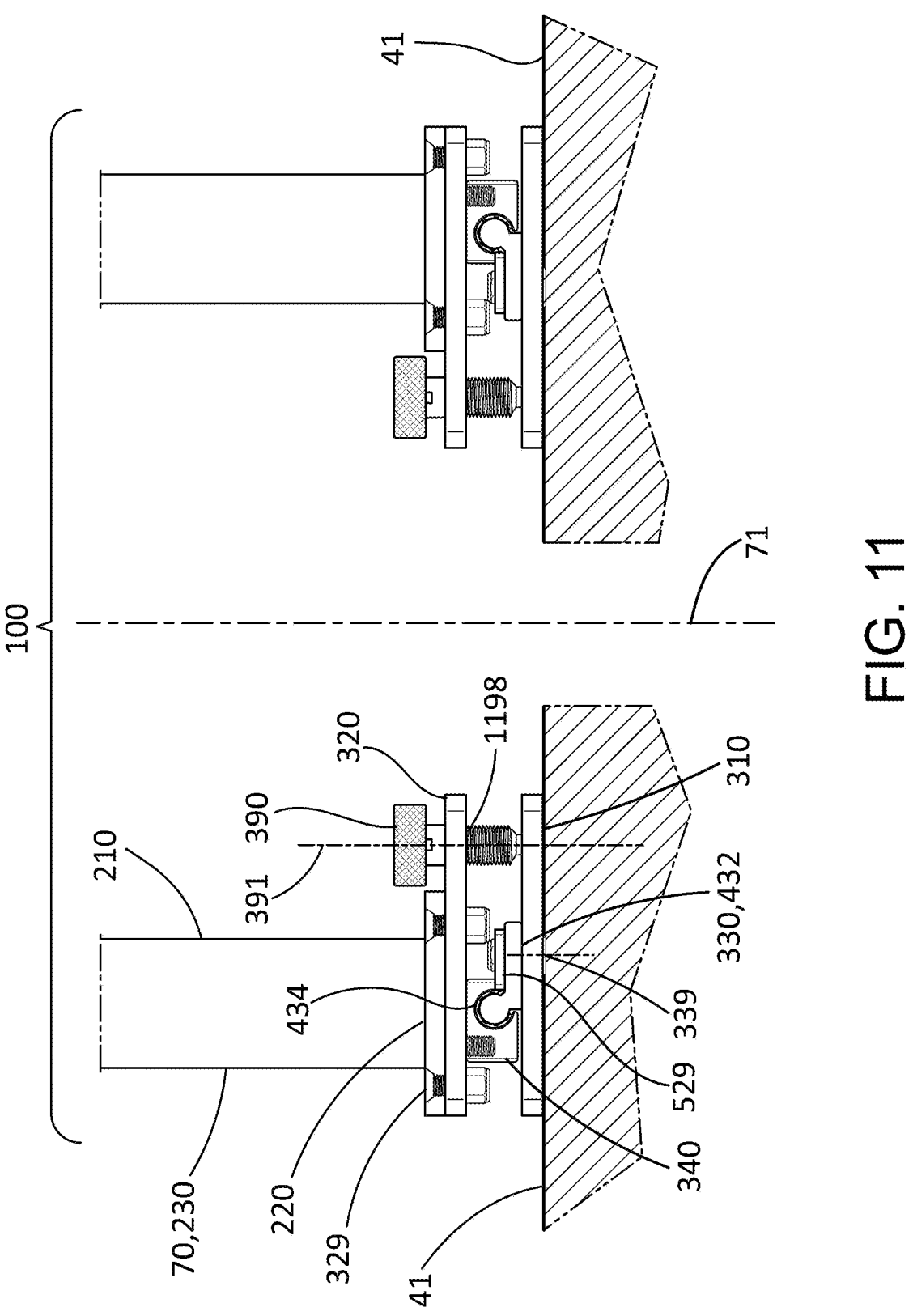
FIG. 11 is a front view of the seat adjustment system of FIG. 2 in accordance with another aspect of the current disclosure.

FIG. 7A is a top view and FIG. 7B is a side view of the foot plate 320 of the seat rail 300 of FIG. 3A. The foot plate 320 can define openings or holes 718 for removably securing the foot plate 320 and, more generally, the seat rail 300, to the seat 70 (shown in FIG. 1B) of the boat 40 (shown in FIG. 1B). The holes 718 can define multiple hole patterns 728 or more specifically, hole patterns A,B,C, each of which can define a rectangular array of the holes 618. Each hole pattern 628 or hole pattern A,B,C can match a corresponding hole pattern on the frame portion 210 (shown in FIG. 2) and, more specifically, the base 220 (shown in FIG. 2), of the seat 70. In some aspects, as shown in FIG. 11, holes defined in the base 220 can be countersunk to allow flush mounting of fasteners such as, for example and without limitation, the fasteners 329 (shown in FIG. 5D) with one or more surfaces of the base 220. In some aspects, holes in the foot plate 320 such as, for example and without limitation, the holes 718 can be countersunk. As shown in FIG. 6B, the foot plate 320 and one or more surfaces thereof can be planar or flat as shown and can define a thickness 327, which can be constant from a first end 715 to a second end 716. In some aspects, dimensions of the foot plate 320 can be at least as shown, at most as shown, or as shown. For example and without limitation, the holes 718 in the hole pattern A can be spaced apart by a distance in the longitudinal direction 301 (shown in FIG. 3A) measuring 8.5 inches, the holes 618 in the hole pattern B can be spaced apart by respective shorter and longer distances in the longitudinal direction 301 measuring 3 inches and 9.5 inches, and the holes 618 in the hole pattern C can be spaced apart by respective shorter and longer distances in the longitudinal direction 301 measuring 3 inches and 8.25 inches. In some aspects, the dimensions of the foot plate 320 can be otherwise.

Figures 8A, 8B, 8C:
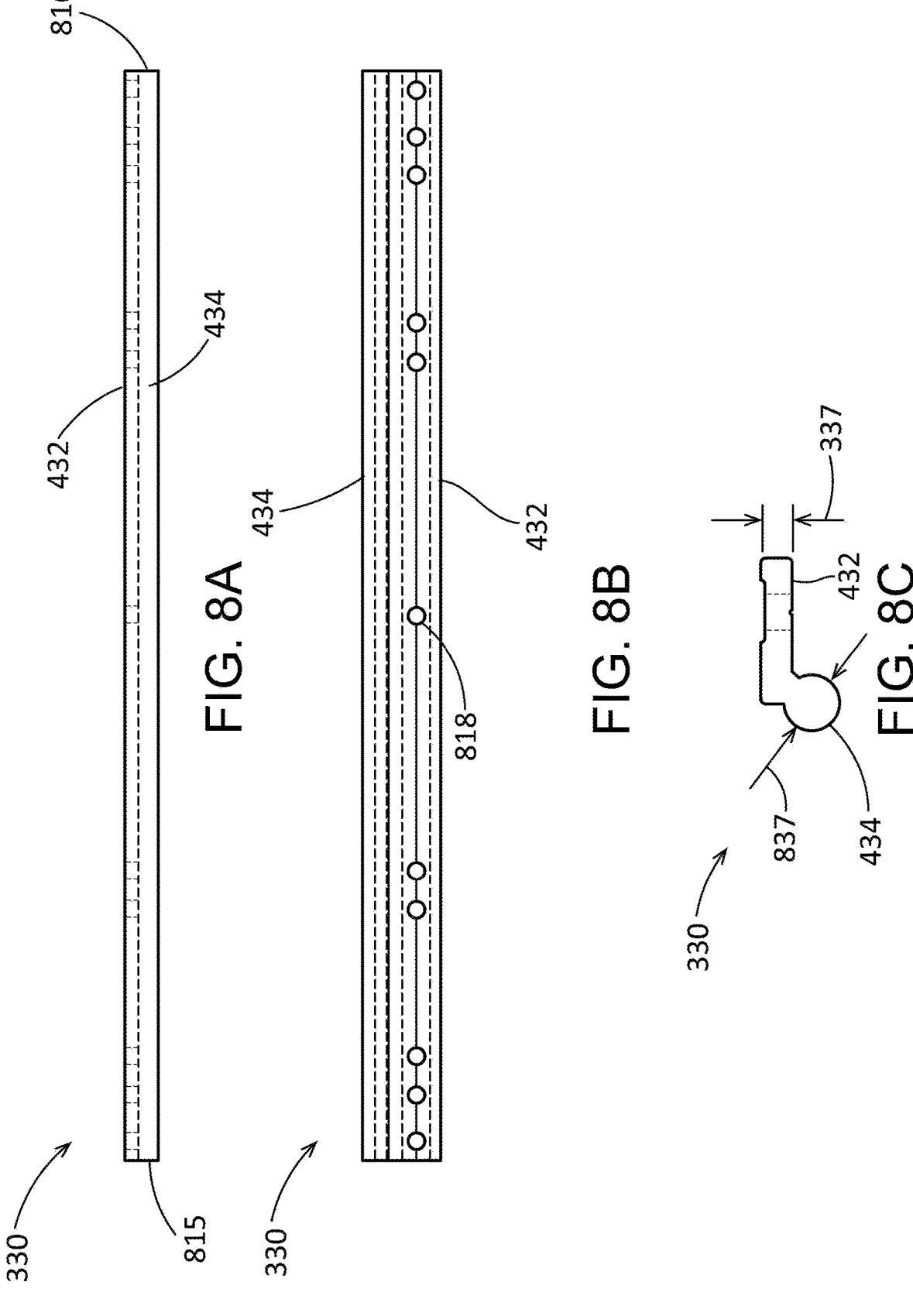
FIG. 8A is a side view of a rail member of the seat rail of FIG. 3B.
FIG. 8B is a bottom view of the rail member of FIG. 8A.
FIG. 8C is an end or front view of the rail member of FIG. 8A.

FIG. 8A is a side view, FIG. 8B is a bottom view, and FIG. 8C is an end or front view of the rail member 330 of the seat rail 300 of FIG. 3A. The rail member 330 can define openings or holes 818 for removably securing the rail member 330 to the foot plate 320 (shown in FIG. 3B). As shown, the mounting portion 432 of the rail member 330 can be planar or flat as shown and can define a thickness 337, which can be constant from a first end 815 to a second end 816. The slide portion 434 of the rail member 330 can define a diameter 837, which can be less than or equal to a diameter 947 (shown in FIG. 9A) of the rail cavity 348 (shown in FIG. 9A). In some aspects, dimensions of the rail member 330 can be at least as shown, at most as shown, or as shown. In some aspects, the dimensions of the rail member 330 can be otherwise. More specifically, a length of the rail member 330 in a longitudinal direction thereof need not match a length of the plates 310,320 or any other component of the seat rail 300 in the same direction upon assembly. As shown, a cross section of at least the slide portion 434 of the rail member 330 can be constant across either a working length thereof (where the rail blocks 340 slide) or across an entire length thereof.

Figure 9A:
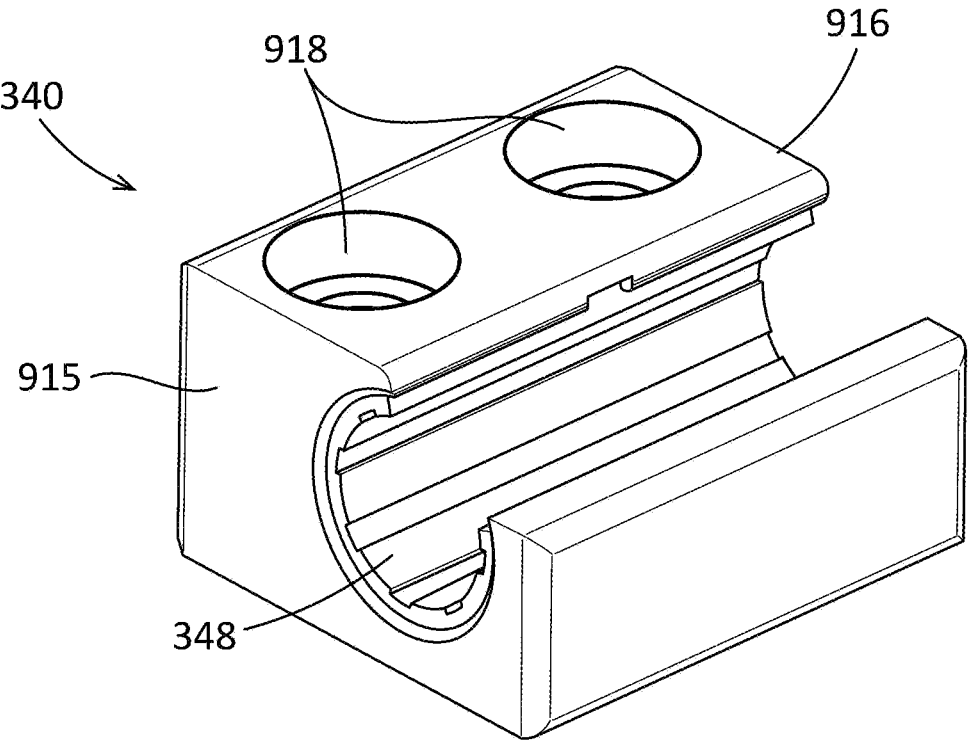
FIG. 9A is a top perspective view of each of or either of a rail block and a floating rail block of the seat rail of FIG. 3A.
Figure 9B:
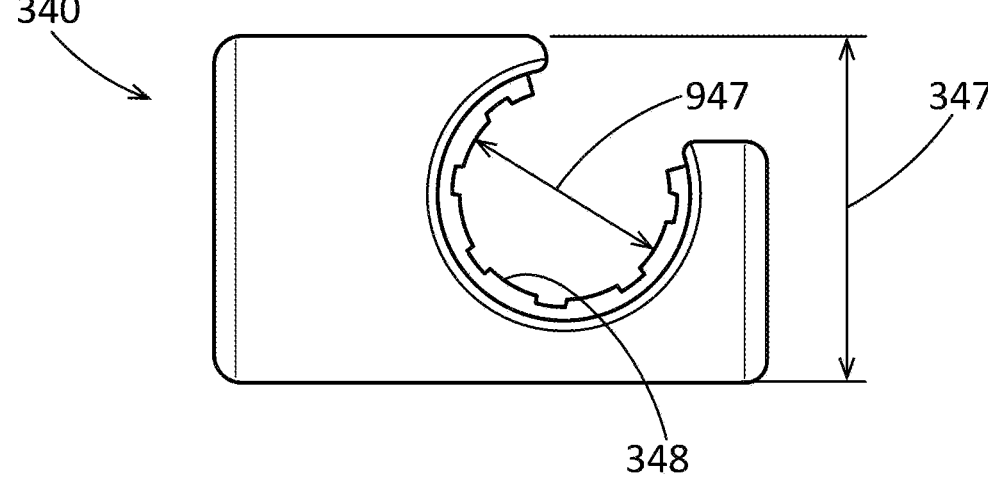
FIG. 9B is an end or front view of the rail block of FIG. 9A.

FIG. 9A is a top perspective view and FIG. 9B is an end or front view of each of or either of the rail block 340 and the floating rail block 340 of the seat rail 300 of FIG. 3A. The rail block can define the rail cavity 348. The rail block 340 can define openings or holes 918 for removably securing the rail block 340 to the mounting plate 310 (shown in FIG. 3B). The rail block 340 can define a maximum thickness 347 (shown in FIG. 9B), which can be constant from a first end 915 to a second end 916. As described above, the rail block 340 and the floating rail block 340 can comprise an insert, which can define the rail cavity 348. In some aspects, the rail blocks 340 can be configured to minimize friction at an interface with the rail member 330. In some aspects, the rail blocks 340 need not be lubricated. As shown, a cross section of at least the rail cavity 348 of the rail block 340 can be constant across a length thereof to facilitate sliding of the rail member 330 therein (shown in FIG. 8C).

Figures 10A, 10B, 10C, 10D:
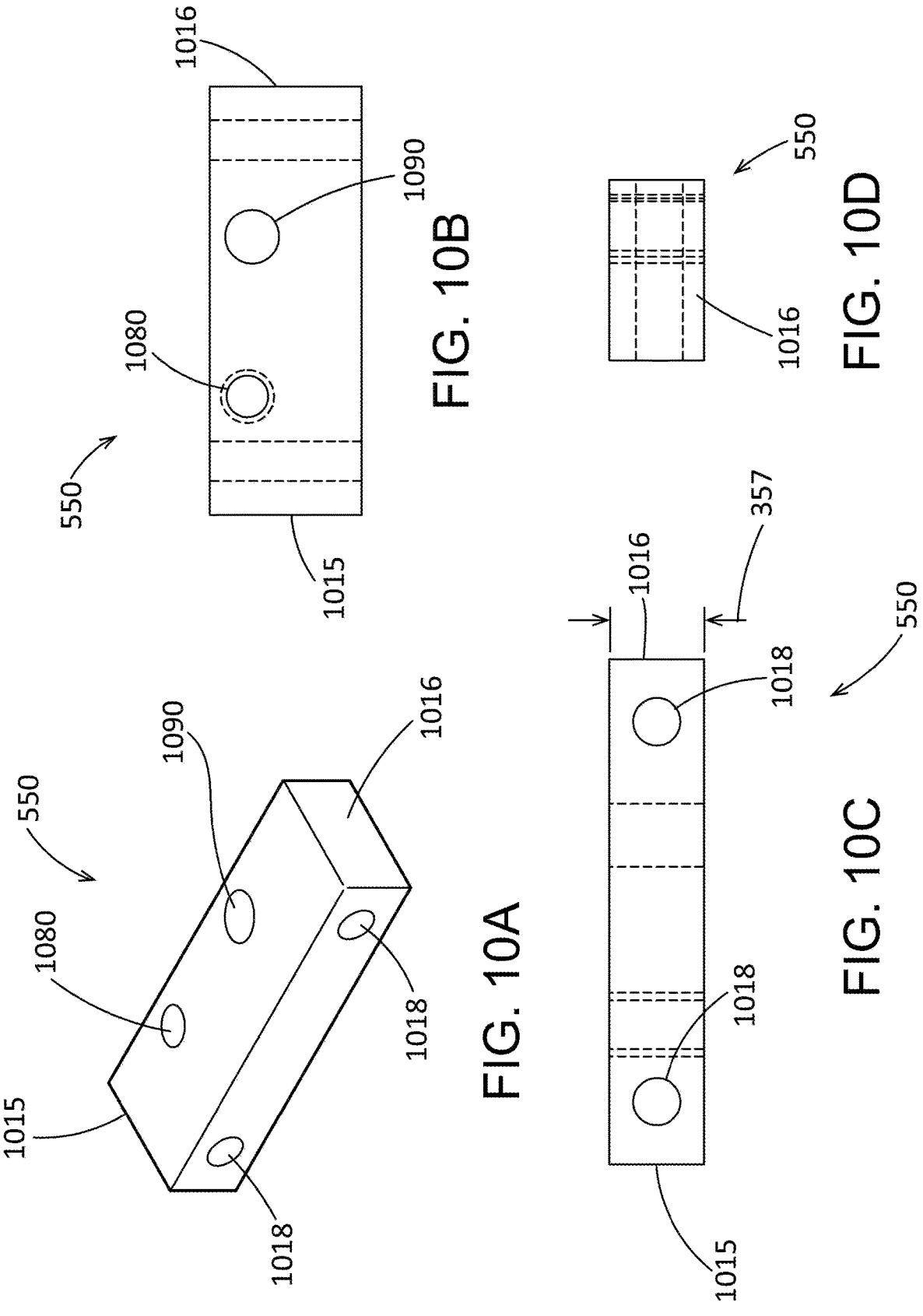
FIG. 10A is a top perspective view of a rail block of the seat rail of FIG. 3B.
FIG. 10B is a side view of the rail block of FIG. 10A.
FIG. 10D is an end or front view of the rail block of FIG. 10A.

FIG. 10A is a top perspective view, FIG. 10B is a side view, FIG. 100 is a top view, and FIG. 10D is an end or front view of the brake block 550 of the seat rail 300 of FIG. 3A. The brake block 550 can define openings or holes 1018 for removably securing the brake block 550 to the mounting plate 310 (shown in FIG. 5D). The brake block 550 can define a first fastener bore 1080, which can be threaded and can be sized to receive the threaded portion 392 of the adjustment fastener 390. The brake block 550 can define a second fastener bore 1090, which can be sized to receive the stop 555 (shown in FIG. 5D). In some aspects, either or both of the first fastener bore 1080 and the second fastener bore 1090 can be positioned between the holes 1018 in a longitudinal direction of the brake block 550 to help maintain a position of the brake block 550 even when the adjustment fastener 390 (shown in FIG. 5D) is tightened, which can thereby load the brake block 550. The brake block 550 can define a thickness 357 (shown in FIG. 100), which can be constant from a first end 1015 to a second end 1016. In some aspects, dimensions of the brake block 550 can be at least as shown, at most as shown, or as shown. In some aspects, the dimensions of the brake block 550 can be otherwise or can be removed from the figures.

FIG. 11 is a front view of the seat adjustment system 100 of FIG. 2 in accordance with another aspect of the current disclosure. In some aspects, as shown, the rail member 330 can extend from or be mounted to the mounting plate 310, and the rail blocks 340 can be mounted to the foot plate 320. In some aspects, as shown, the separate fasteners 339 can secure the rail member 330 to the mounting plate 310. In some aspects, as shown, the one or more stops 529 can be secured or formed with the fasteners 339.

In some aspects, as shown, the fastener axis 391 of the adjustment fastener 390 can be perpendicular to either or both of an orientation of the plates 310,320 and the floor 41. More specifically, without the rail brake 350 the adjustment fastener 390 can still be secured to and extend through the foot plate 320—and, more specifically, an opening or hole 1198 defined therein—and can engage the mounting plate 310 and thereby prevent movement of the foot plate 320—and, by extension, also the seat 70—with respect to the mounting plate 310. In some aspects, the adjustment fastener 390 can threadably engage the hole 1198. In some aspects, the adjustment fastener 390 can extend through threads defined in and/or a nut (e.g., a PEM® self-clinching nut available from Penn Engineering) mounted to the foot plate 320. As shown, the second portion 394 of the adjustment fastener 390 can comprise a handle or knob, which can comprise a knurled portion to facilitate and permit tightening by a user without tools. In some aspects, a tip of the adjustment fastener 390 can extend into a hole or cavity or other opening (not shown) in the mounting plate 310—or in another portion of the seat rail 300 with which the adjustment fastener 390 is engaged, directly or indirectly (e.g., the rail member 330)—to provide either the aforementioned indexing features (where the seat rail 300 settles in one of a plurality of natural adjustment or detent positions) or to provide a positive lock for the components of the seat rail 300 beyond mere friction between the components.

In some aspects, as shown, the adjustment fastener 390 can be positioned on an inboard side of the frame portion 210 of the seat 70, which can ease passage of a user around an outside of the seat 70. In some aspects, as shown in FIG. 2, the adjustment fastener 390 can be positioned on an outboard side of the frame portion 210 of the seat 70, which can increase or otherwise improve storage under the seat 70. In some aspects, the orientations of the rail member 330 and the rail blocks 340 can mirror, at least in part, the geometry shown. For example, the slide portion 434 of the rail member 330 can extend toward a centerline 71 of the seat 70, i.e., the slide portion 434 can be closer to the centerline of the seat 70 with respect to the mounting portion 432. The seat 70 and the seat adjustment system 100 can be symmetrical about the centerline of the seat 70.

Figure 12A:
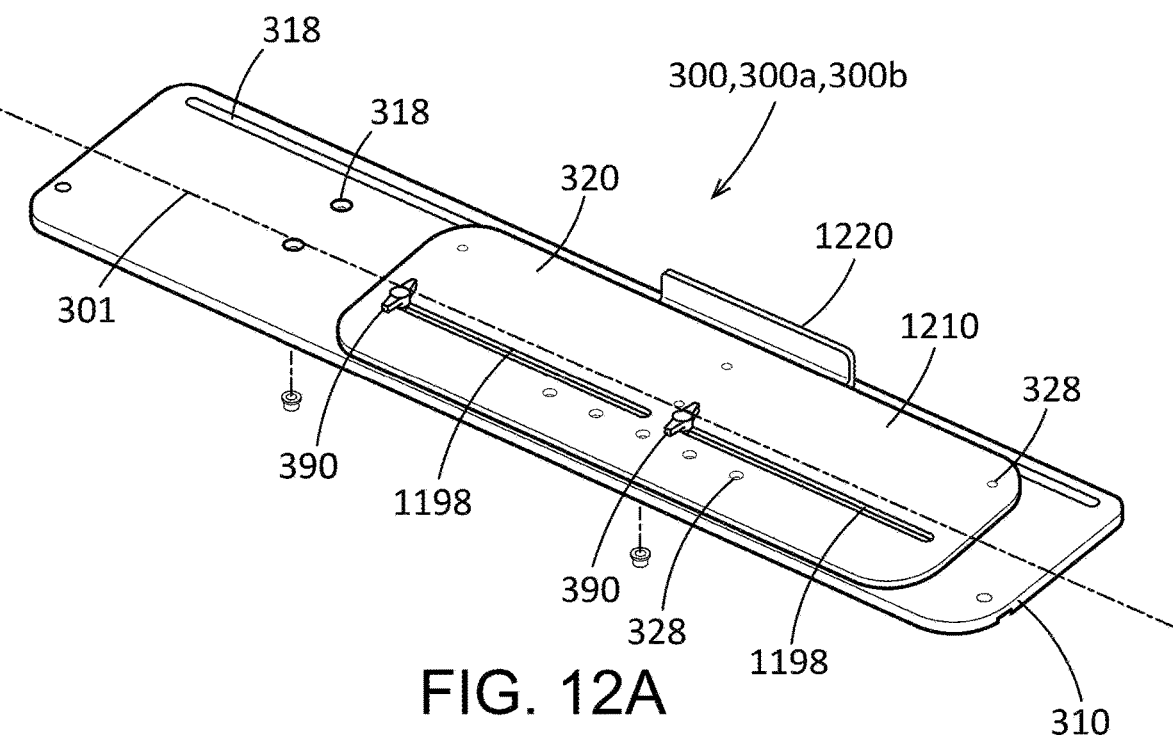
FIG. 12A is a top front perspective view of a seat rail of the seat adjustment system of FIG. 2 showing the seat rail in a first extended condition in accordance with another aspect of the current disclosure.
Figure 12B:
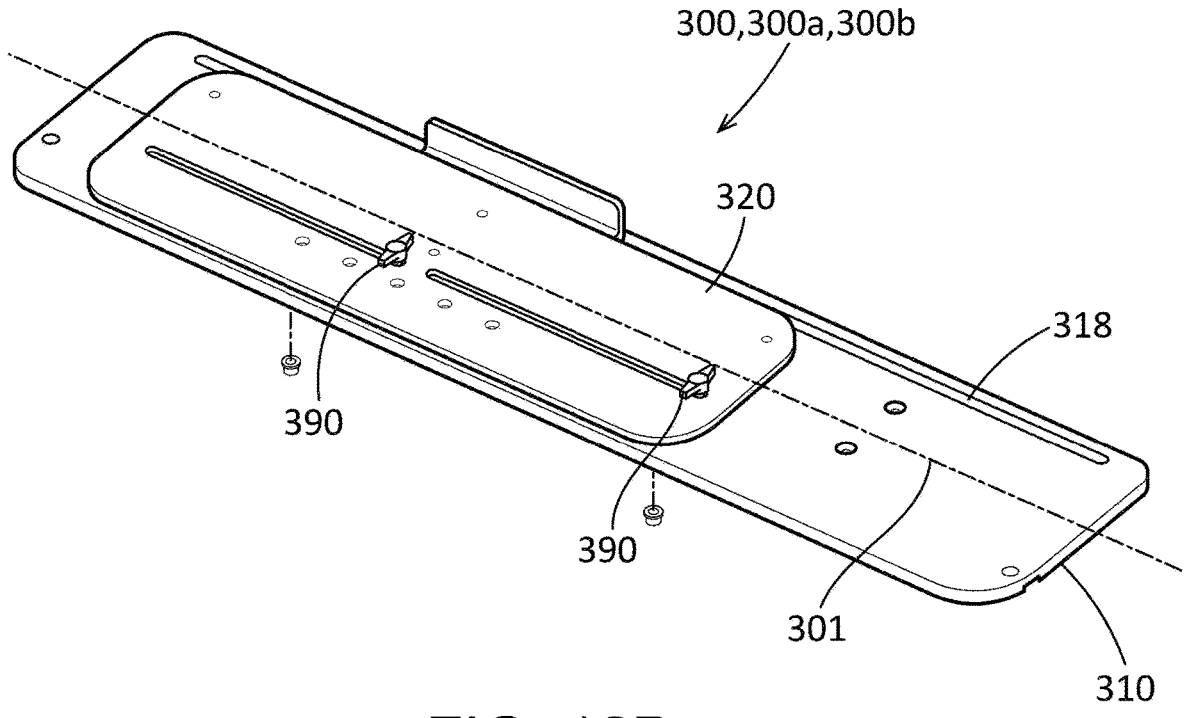
FIG. 12B is a top front perspective view of the seat rail of FIG. 12A showing the seat rail in a second extended condition.

FIG. 12A is a top front perspective view of the seat rail 300 of the seat adjustment system 100 of FIG. 2 in accordance with another aspect of the current disclosure showing the seat rail 300 in a first extended condition, and FIG. 12B is a top front perspective view of the seat rail 300 of FIG. 12A showing the seat rail 300 in a second extended condition, which can be offset from the first extended condition along the longitudinal direction 301. In some aspects, as shown, no rail member 330 is necessary and the foot plate 320 can be in facing or mating contact with the mounting plate 310. In some aspects, one or more inserts or spacers (not shown), which can be washers, can be positioned between the mounting plate 310 and the foot plate 320. Such spacers can be formed from a low-friction polymer such as acetal. As shown, the seat rail 300 can comprise a plurality of the adjustment fasteners 390. More specifically, the seat rail 300 can comprise a pair of the adjustment fasteners 390. In some aspects, the second portion 394 of the adjustment fastener 390 can define a "T" shape. More specifically, a plurality of the openings 1198 in the foot plate 320 can be slotted or elongated as shown and can slidably receive the adjustment fasteners 390. In some aspects, as shown, the foot plate 320 can comprise a tab or flange 1220, which can extend from a main portion 1210 of the foot plate 320 and can be angled with respect to the main portion 1210. The flange 1220 can facilitate placement or positioning of the base 220 of the frame portion 210 of the seat 70 in a left to right direction. The mounting plate 310 can define one or more openings 318, one of which can be slotted as shown. The foot plate 320 can define one or more of the openings 328. In some aspects, the one or more openings 318 can correspond to the holes 618 (shown in FIG. 6A), and the one or more openings 328 can correspond to the holes 718 (shown in FIG. 7A).

Figures 13A, 13B:
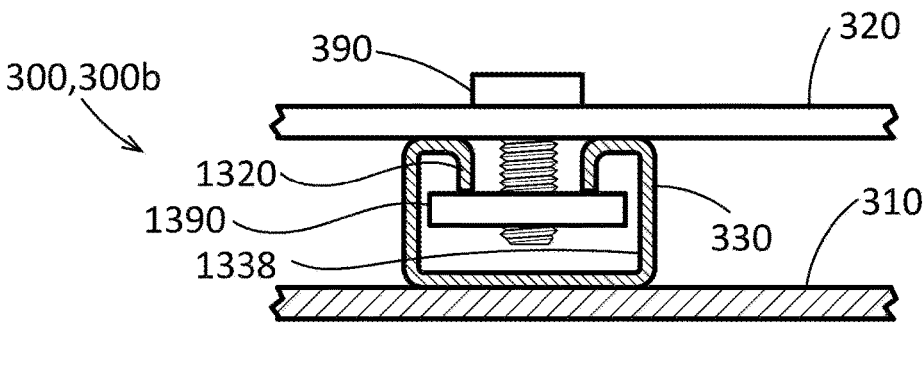
FIG. 13A is a top front perspective view of the seat adjustment system of FIG. 2 also showing the seat and a seat rail inside the boat of FIG. 1A in a first extended condition in accordance with another aspect of the current disclosure.
FIG. 13B is a sectional view of the seat rail of FIG. 13A taken from line 13B-13B of FIG. 13A.

FIG. 13A is a top front perspective view of the seat adjustment system 100 of FIG. 2 in accordance with another aspect of the current disclosure with the seat 70 and showing the seat rail 300 in a first extended condition. As shown, the rail member 330 can be secured to the mounting plate 310. In some aspects, as shown, one of the adjustment fasteners 390 of the seat rail 300 can comprise a cam handle 396. The cam handle 396 can be Part No. 5720K61 from McMaster-Carr. The adjustment fastener 390 can further comprise a T-slot nut or bolt 1390 (T-slot nut 1390 shown in FIG. 13B), which can be lockably received within a slotted channel 1338 of the rail member 330.

FIG. 13B is a sectional view of the seat rail 300 of FIG. 13A taken from line 13B-13B of FIG. 13A. As shown, the rail member 330 can comprise or define the slotted channel 1338, which can lockably receive a portion of the adjustment fastener 390. The rail member 330 can define a "U" shape and can comprise downturned interior lips or flanges 1320 for increased rigidity and resistance against pullout when the seat 70 and the seat rail 300 and, more specifically, the one or more adjustment fasteners 390 are loaded.

Figure 13C:
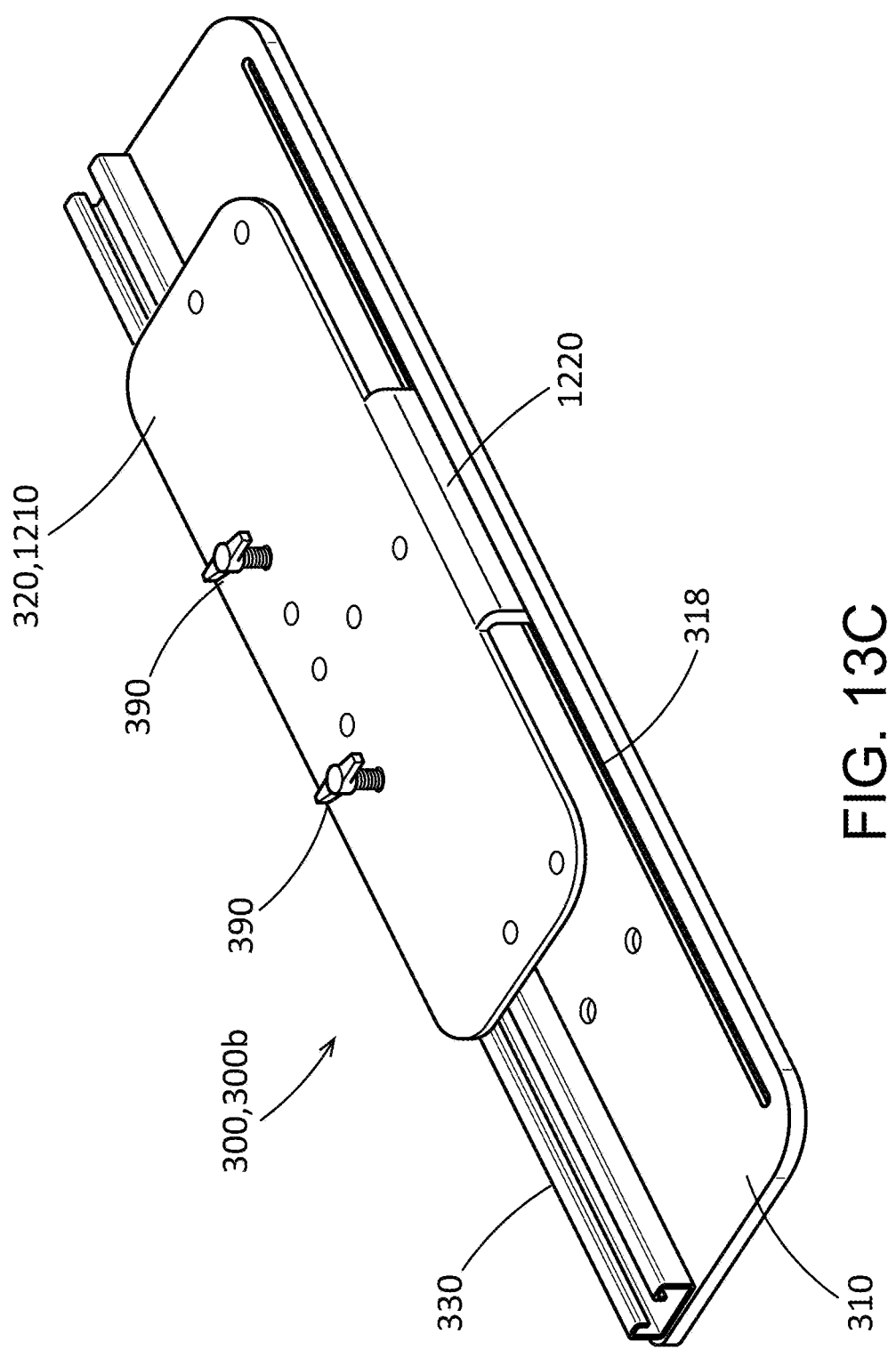
FIG. 13C is a perspective view of the seat rail of FIG. 13A in accordance with another aspect of the current disclosure in which the foot plate or at least a flange thereof is facing in an opposite direction.
Figure 13D:
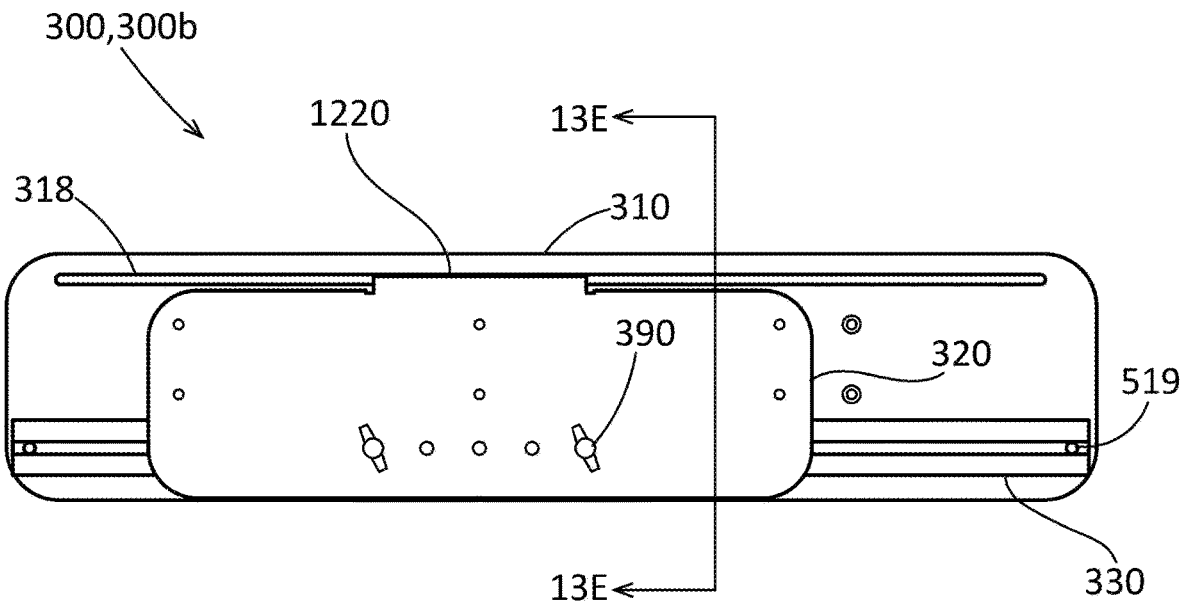
FIG. 13D is a top view of the seat rail of FIG. 13C.
Figure 13E:
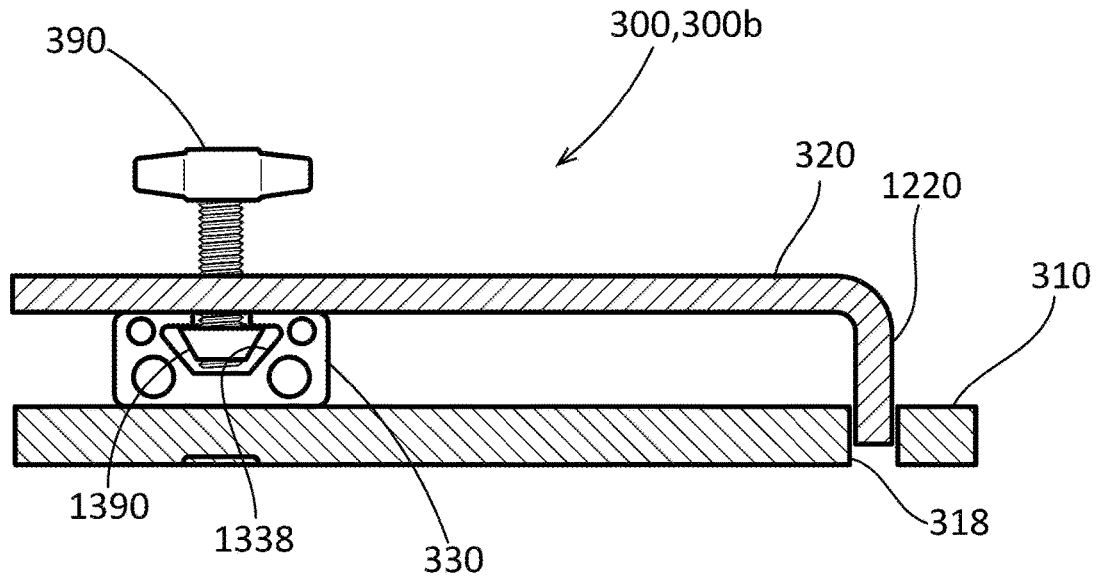
FIG. 13E is a sectional view of the seat rail of FIG. 13D taken from line 13E-13E of FIG. 13D.

FIG. 13C is a perspective view, FIG. 13D is a top view, and FIG. 13E is a sectional view of the seat rail 300 of FIG. 13A in accordance with another aspect of the current disclosure in which the foot plate 320 or the flange 1220 thereof is facing in an opposite direction. More specifically, the flange 1220 can extend from a remaining portion of the foot plate 320, can be angled with respect to the foot plate 320, and can be received within the opening 318 defined in the mounting plate 310. The flange 1220 can extend in a longitudinal direction of the foot plate 320. The opening 318 can be a slot as shown and can similarly extend in a longitudinal direction of the mounting plate 310 and can be aligned with the flange 1220. Travel or movement of the foot plate 320 with respect to the mounting plate 310 can be limited by a range of possible movement of the flange 1220 inside the opening 318, which can be determined by the position and length in the corresponding longitudinal direction of each of the mounting plate 310 and the foot plate 320.

Figures 14A, 14B:
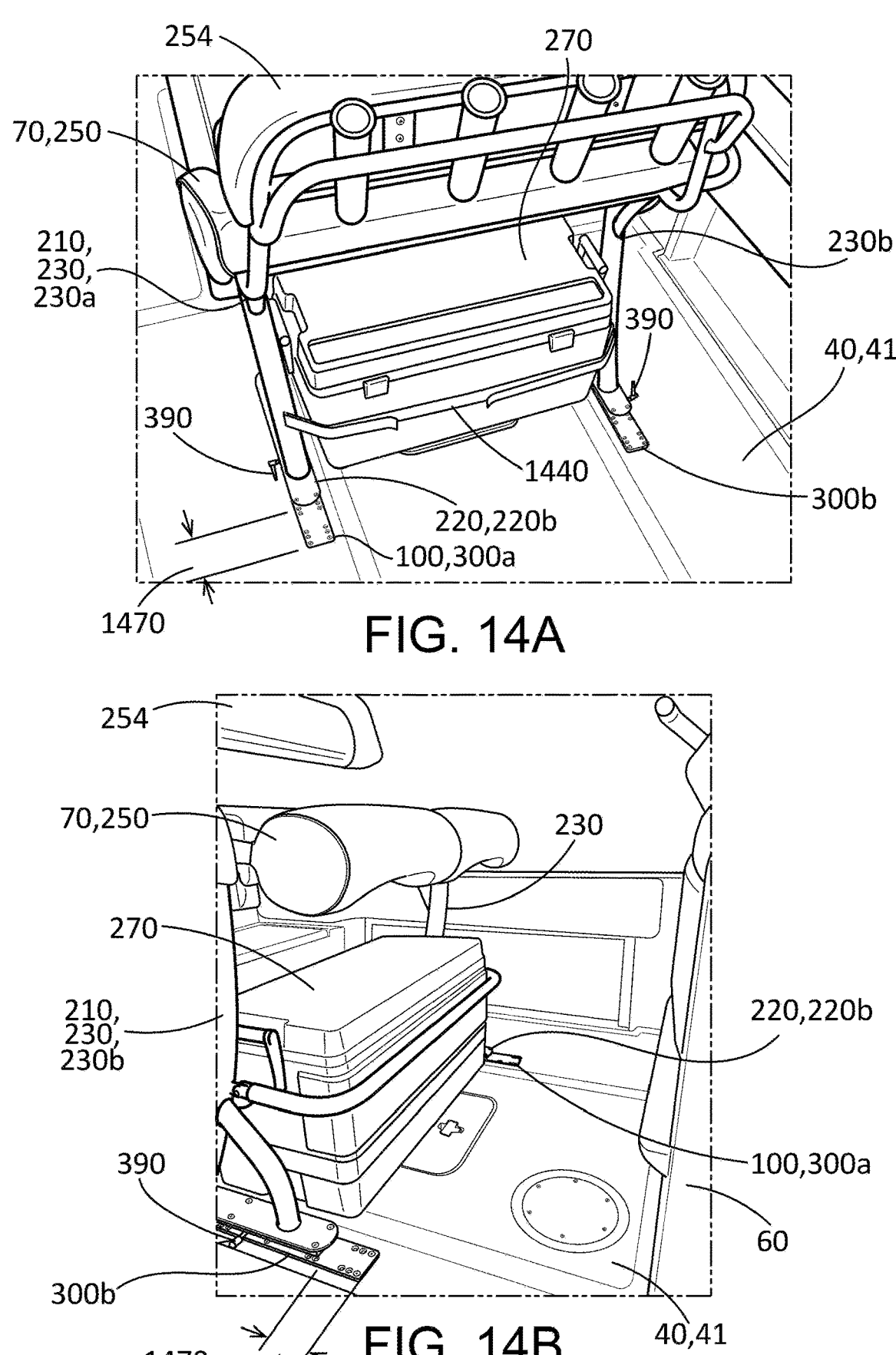
FIG. 14A is a top rear perspective view of the seat and the seat adjustment system of FIG. 2 showing the seat rail in a first extended condition.
FIG. 14B is a side front perspective view of the seat and the seat adjustment system of FIG. 14A.

FIG. 14A is a top rear perspective view of the seat adjustment system 100 of FIG. 2 in accordance with another aspect of the current disclosure with the seat 70 and showing the seat rails 300*a,b* in a first extended condition. In some aspects, as shown, the foot plate 320 of each seat rail 300 can move with respect to the mounting plate 310 of each seat rail 300 and the ends thereof can be offset by the overall adjustment distance 1470. In some aspects, the foot plate 320 and the mounting plate 310 can be different sizes in a longitudinal direction of the seat rail 300 (as shown in FIGS. 12A and 12B, for example) or in a transverse direction that is perpendicular to the longitudinal direction. As such, the distance between the ends of the foot plate 320 and the mounting plate 310 need not be the overall adjustment distance 1470. In some aspects, the overall adjustment distance 1470 can be 4 inches. In some aspects, the overall adjustment distance 1470 can be less than or greater than 4 inches by movement of components of the seat rails 300 such as the rail blocks 340 and/or by lengthening of the plates 310,320 and/or the rail member 330. As shown, a strap 1440 or other structural member can extend from and between the frame members 230*a,b* of the seat 70.

FIG. 14B is a side front perspective view of the seat adjustment system 100 of FIG. 13A showing the seat rails 300*a,b* in a second extended condition.

FIGS. 15A-15E show various views of the boat 40 of FIG. 1A showing a user sitting on or leaning against the leaning post or, more generally, the seat 70. FIG. 15A is, more specifically, a side perspective view of the boat 40 of FIG. 1A showing a user sitting in the seat 70. As shown, the seat height HS (shown in FIG. 2A) of the seat 70 can be high enough for the user's legs to not reach the floor 41 of the boat 40 when the user is seated.

FIG. 15B is a side perspective view of the boat 40 of FIG. 1A showing a user sitting in the seat 70 thereof and with the seat 70 in a first position, and FIG. 15C is a side perspective view of the boat 40 of FIG. 1A showing a user sitting in the seat 70 thereof and with the seat 70 in a second position. As shown, the distance 65 between the console 60 and a front edge of the seat portion 250 of the seat 70 can be reduced between the first position and the second position by adjustment of the seat adjustment system 100.

FIG. 15D is a side perspective view of the boat 40 of FIG. 1A showing a user standing in front of the seat 70 thereof and with the seat 70 in a first configuration, and FIG. 15E is a side perspective view of the boat 40 of FIG. 1A showing a user standing in front of the seat 70 thereof and with the seat 70 in a second configuration. As shown, the distance 65 between the console 60 and a front edge of the seat portion 250 of the seat 70 can be increased between the first configuration or position and the second configuration or position by adjustment of the seat portion 250 itself, as shown. More specifically, a portion of the seat portion 250 can be repositioned by rotating a portion of the seat portion 250 away from the console 60.

In some aspects, the mounting plate 310 can be secured to the boat 40, and the foot plate 320 can be secured to the seat 70, and the mounting plate 310 and the foot plate 320 can be removably fastened to each other in one of a variety of preset positions without quick adjustment. More specifically, instead of loosening the adjustment fastener 390 and sliding the seat adjustment system 100 fore or aft, fasteners can be removed entirely, the foot plate 320 can be repositioned, and the fasteners can be reinstalled to resecure the foot plate 320. Placement of the foot plate can be set upon purchase of the boat to fit the boater's preference for at least a more comfortable position of the seat 70.

In some aspects, the seat 70 can be hinged so a portion thereof can be moved out of the way of the user(s), especially when the boat 40 is not in transit. In some aspects, a portion of the seat adjustment system (e.g., the mounting plate 310 or the foot plate 320) can define teeth and a mating component can define one or more grooves configured to receive the teeth and thereby selectively lock a position of the parts with respect to each other. In some aspects, a pivoting lock such as, for example, that used on a window, can lock a position of the parts with respect to each other by rotating into and out of a locked position. In some aspects, as shown, the seat adjustment system 100 can be adjusted manually, In some aspects, the seat adjustment system 100 can be adjusted with a motor, and a threaded rod or other electromechanical actuator can facilitate movement of the parts with respect to each other.

In some aspects, the mounting plate 310 and the foot plate 320 can be removably fastened to each other with pins, which can be quick release fasteners (not shown) removable without tools. To reposition the seat from one location to another, the pins can be removed and positioned through different holes. Without any slide or rail components, a plurality of holes can be defined along an extruded rail, and front and rear seat posts of the seat 70 can be pinned to the extruded rail.

In some aspects, a pipe (not shown)—full or partial in cross-section—can be secured to each of the mounting plates 310, and each of the corresponding foot plates 320 or the bases 220 of the seat 70 can be clamped or fastened to the pipe.

In some aspects, the foot plates 320 of the seat rails 300*a,b* can be joined to each other with one or more connecting members (not shown), which in some aspects can reduce binding of the seat adjustment system 100 during use. More specifically, the connecting member joining the foot plates 320 can comprise one or more bars extending in a transverse direction of the seat rails 300. In some aspects, the connecting members can be flat. In some aspects, the connect members can comprise flanges or other protruding features for reinforcement.

In some aspects, ball bearings could be positioned in a track defined between the mounting plate 310 and the foot plate 320.

A method of using the seat adjustment system 100 can comprise any one or more of the following steps:

Mounting the rail blocks 340 to the mounting plate 310;

Assembling the rail brake 350 to the mounting plate 310;

Mounting the mounting plate 310 to the floor 41 of the boat 40;

Mounting the rail member 330 to the foot plate 320;

Mounting the foot plate 320 to the base 220 of the seat 70;

Mounting the foot plate 320 to the mounting plate 310, which can comprise slideably engaging the rail member 330 with the rail blocks 340;

Loosening the adjustment fastener 390, moving the foot plate 320 with respect to the mounting plate 310, and tightening the adjustment fastener 390; and/or Tightening the adjustment fastener 390 can comprise rotating from a loose condition to a tightened condition with the adjustment fastener 390 and without tools.

The seat adjustment system 100 or portions thereof can, in some aspects, yield any one or more of the following benefits:

Specifically accommodate leaning posts and not just bench seats or helm seats for which other adjustment devices are configured;

Define a lower profile, preventing the seat from sitting too high (and, in some aspects, the overall assembled height 570 of the seat adjustment system 100 including the mounting plate 310 and the foot plate 320 can measure as little as 0.5 inches as shown, for example and without limitation, in FIG. 12A or as little as 1.25 inches as shown, for example and without limitation, in FIG. 5A and can therefore measure in a range of 0.5 inches to 1.25 inches, inclusive);

Be secured at any position along the range of travel;

Allow for a wider range of travel;

Allow for travel both fore and aft from the nominal or base position;

Accommodate any range of seat width as the two rails need not be connected;

Accommodate any model or make of boat;

Facilitate quick and easy adjustment or readjustment without tools;

Allow adjustment with a concealed adjustment fastener 390, which can be positioned and hidden between the mounting plate 310 and the foot plate 320 but still accessible for adjustment with a mating tool (e.g., an Allen head fastener adjustable with an Allen wrench).

Facilitate quick and easy installation by the boater himself or herself;

Eliminate trip hazards by a low profile of not only the seat rail 300 but also the adjustment fastener 390 thereof; and/or Use existing holes in the boat and not require drilling of holes in the boat.

Regarding general construction of the seat adjustment system 100 and other structures disclosed herein, in some aspects no adhesive need be used to join mating parts. In some aspects, an adhesive can be used to join mating parts. In some aspects, any of the components of the seat adjustment system 100 can be joined to each other using a friction fit connection, a snap-fit connection, a threaded connection, a magnetic connection, a fastener, or any other connection as desired.

The components of any of the seat adjustment system 100 and any portion thereof can be manufactured using any one or more of a number of different materials. For example and without limitation, the rail member 330 and the rail blocks 340 and other components disclosed herein can comprise or be formed from aluminum (e.g., an aluminum alloy such as, for example and without limitation, a 6061 series aluminum alloy). For example and without limitation, either or both of the mounting plate 310 and the foot plate 320 and other components disclosed herein can comprise or be formed from stainless steel. More specifically, either or both of the mounting plate 310 and the foot plate 320 and other components disclosed herein can be formed from a blank of flat material. For example and without limitation, either or both of the mounting plate 310 and the foot plate 320 and other components disclosed herein can be monolithic. For example and without limitation, For example and without limitation, structural parts such as, for example and without limitation, the brake block 550 and the insert received within the rail blocks 340 can be formed from polymer materials, including high-impact polymers such as acetal or ABS. Use of acetal as a material can minimize friction between the part formed from the material and mating parts.

The components of any of the seat adjustment system 100 and any portion thereof can be manufactured using any one or more of a number of different processes. In some aspects, portions of the seat adjustment system 100 can be manufactured using subtractive manufacturing and, in some cases, also sheetmetal processes such as laser cutting, stamping, and/machining. In some aspects, portions of the seat adjustment system 100 can be manufactured using a molding process such as injection molding. In other aspects, any of these same parts can be manufactured through an additive manufacturing process such as, for example and without limitation, three-dimensional printing or through a subtractive manufacturing process such as, for example and without limitation, machining. One or more components of the seat adjustment system 100 can be powder coated or can comprise a powder coating or other protective coating. One or more edges can be eased or rounded through one or more processes such as, for example and without limitation, deburring and/or chamfering processes.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A system for a boat, the system comprising:
a pair of seat rails configured to simultaneously couple the seat to a floor of the boat in any one of multiple positions in a longitudinal direction of the seat rails, the seat rails being parallel to each other when the seat is coupled to the floor, each seat rail of the pair of seat rails comprising:
a rail member configured to be mounted to one of the seat and the floor; and
rail blocks configured to be secured to the other of the seat and the floor and defining a rail cavity sized to slidably receive the rail member;
wherein each of a slide portion of the rail member and the rail cavity of the rail blocks is at least in part circular in cross-section.

2. The system of claim 1, wherein:
each seat rail of the pair of seat rails comprises:
a mounting plate configured to secure a seat to the boat; and
a foot plate configured to secure the seat to the mounting plate;
the seat rails of the pair of seat rails are not connected to each other except through the seat or the floor of the boat; and
an overall assembled height of each seat rail of the pair of seat rails measures less than or equal to 1.25 inches.

3. The system of claim 2, wherein:
the mounting plate of each seat rail defines holes defining multiple mounting plate hole patterns, each mounting plate hole pattern matching a boat hole pattern defined in one of a plurality of boats and configured to secure the seat to any one of the plurality of boats; and
the foot plate of each seat rail defines holes to removably secure the seat, the holes defining multiple foot plate hole patterns, each foot plate hole pattern matching a seat hole pattern defined in a base of one of a plurality of seats and configured to secure any one of the plurality of seats to the mounting plate.

4. The system of claim 2, further comprising a rail brake comprising an adjustment fastener, the adjustment fastener extending through the foot plate and configured to engage with the mounting plate to lock a position of the foot plate with respect to the mounting plate.

5. The system of claim 4, wherein the adjustment fastener is configured to be tightened and loosened without tools.

6. The system of claim 4, wherein the adjustment fastener is configured to fix a position of the seat in the longitudinal direction of the seat rails at any one of two or more indexing features.

7. The system of claim 2, wherein each seat rail further comprises:

a rail brake configured to fix a position of the foot plate relative to the mounting plate in a longitudinal direction of the seat rail.

8. The system of claim 7, wherein each seat rail further comprises a stop configured to limit movement of the foot plate with respect to the mounting plate in the longitudinal direction of the seat rail.

9. The system of claim 7, wherein the rail brake comprises an adjustment fastener and a floating rail block, the floating rail block engaged with the rail member and configured to bind against and lock a position of the rail member upon tightening of the adjustment fastener.

10. The system of claim 9, wherein the adjustment fastener is configured to be tightened and loosened without tools.

11. A boat comprising the system of claim 1, wherein each seat rail of the pair of seat rails couples the seat to the floor of the boat, the seat rails of the pair of seat rails not connected to each other except through the seat or the floor of the boat.

12. A system comprising:

a seat; and a pair of seat rails configured to simultaneously couple the seat to a floor of a boat in any one of multiple positions in a longitudinal direction of the seat rails, the seat rails being parallel to each other when the seat is coupled to the floor, the seat rails defining an open space between the seat rails unobstructed by the seat rails and sized to receive a stored item, the pair of seat rails configured to receive the stored item therebetween on the floor, each seat rail of the pair of seat rails comprising:

a rail member configured to be mounted to one of the seat and the floor; and rail blocks configured to be secured to the other of the seat and the floor and defining a rail cavity sized to slidably receive the rail member;

wherein each of a slide portion of the rail member and the rail cavity of the rail blocks is at least in part circular in cross-section.

13. The system of claim 12, wherein:

each seat rail of the pair of seat rails comprises:

a mounting plate configured to secure the seat to the boat; and a foot plate configured to secure the seat to the mounting plate; and the seat rails of the pair of seat rails are not connected to each other except through the seat or the floor of the boat.

14. The system of claim 13, wherein the seat rails of the pair of seat rails are configured to be not connected to each other except through the seat or the floor of the boat, the seat rails of the pair of seat rails defining, upon assembly to the boat, an open space therebetween for storage of a stored item on a floor of the boat.

15. The system of claim 12, wherein the seat is a leaning post defining a seat height of at least 30 inches, the seat is positioned between a console of the boat and a stern of the boat.

16. A method of using a seat adjustment system for a boat, the method comprising:

mounting a first portion of each of a pair of seat rails of the seat adjustment system to a floor of the boat;

mounting a second portion of each of the pair of seat rails of the seat adjustment system to a seat of the boat, the seat positioned between a console of the boat and a stern of the boat; and mounting the second portion to the first portion, the second portion securable to the first portion in any one of multiple positions in a longitudinal direction of the pair of seat rails;

wherein:

the first portion of each of the pair of seat rails comprises one of a) a rail member and b) rail blocks, the rail member configured to be mounted to one of the seat and the floor; and the rail blocks configured to be secured to the other of the seat and the floor and defining a rail cavity sized to slidably receive the rail member;

the second portion of each of the pair of seat rails comprises the other of a) the rail member and b) the rail blocks; and each of a slide portion of the rail member and the rail cavity of the rail blocks is at least in part circular in cross-section.

17. The method of claim 16, wherein the first portion comprises a mounting plate positioned between one of a) the rail member and b) the rail blocks and the second portion comprises a foot plate positioned between the other of a) the rail member and b) the rail blocks; each of the pair of seat rails of the seat adjustment system further comprising:

a rail brake configured to fix a position of the foot plate relative to the mounting plate in a longitudinal direction of the pair of seat rails, the rail brake comprising an adjustment fastener.

18. The method of claim 17, further comprising:

loosening the adjustment fastener of the seat adjustment system;

moving a position of the seat from a first position to a second position offset from the first position in the longitudinal direction of the pair of seat rails; and tightening the adjustment fastener to fix a position of the foot plate relative to the mounting plate in a longitudinal direction of the pair of seat rails.

19. The method of claim 16, wherein the seat is a leaning post.

20. A boat comprising the system of claim 12, wherein each seat rail of the pair of seat rails couples the seat to the floor of the boat, each seat rail of the pair of seat rails further comprising a rail brake configured to fix a position of the foot plate relative to the mounting plate in a longitudinal direction of the seat rail, the rail brake comprising:

an adjustment fastener; and a floating rail block, the floating rail block engaged with the rail member and configured to bind against and lock a position of the rail member with respect to the floating rail block upon tightening of the adjustment fastener.

* * * * *